(12) United States Patent
Kalkanoglu et al.

(10) Patent No.: US 9,677,277 B2
(45) Date of Patent: Jun. 13, 2017

(54) ROOFING PRODUCT INCLUDING A CERAMIC BASE MATERIAL AND RECYCLED ROOFING MATERIAL

(75) Inventors: Husnu M. Kalkanoglu, Swarthmore, PA (US); Gregory F. Jacobs, Oreland, PA (US); Paul A. Benensky, Trappe, PA (US)

(73) Assignee: CERTAINTEED CORPORATION, Malvern, PA (US)

( * ) Notice: Subject to any disclaimer, the term of this patent is extended or adjusted under 35 U.S.C. 154(b) by 952 days.

(21) Appl. No.: 12/619,155

(22) Filed: Nov. 16, 2009

(65) Prior Publication Data
US 2010/0129667 A1    May 27, 2010

Related U.S. Application Data

(60) Provisional application No. 61/118,181, filed on Nov. 26, 2008.

(51) Int. Cl.
*E04D 1/28*      (2006.01)
*E04D 5/10*      (2006.01)
(Continued)

(52) U.S. Cl.
CPC ............... *E04D 1/28* (2013.01); *C08L 95/00* (2013.01); *E04D 5/10* (2013.01); *B32B 37/24* (2013.01);
(Continued)

(58) Field of Classification Search
CPC .... E04D 5/10; E04D 1/22; E04D 1/28; C08L 95/00; B32B 2272/00; B32B 11/04; B32B 2395/00; B32B 2419/06
(Continued)

(56) References Cited

U.S. PATENT DOCUMENTS 4,233,353 A    11/1980  Bondoc et al.
4,726,846 A *  2/1988   Jackson et al. .......... 106/284.01
(Continued)

FOREIGN PATENT DOCUMENTS

CA    2719586 A1    5/2011
CA    2719589 A1    5/2011

OTHER PUBLICATIONS

Canadian Office Action dated Oct. 26, 2011 with regard to corresponding Canadian Application No. 2,690,638.
(Continued)

*Primary Examiner* — David Sample
*Assistant Examiner* — Nicholas W Jordan
(74) *Attorney, Agent, or Firm* — Abel Law Group, LLP; Alexander H. Plache

(57) ABSTRACT

A roofing product can include a ceramic base material and a recycled roofing material. In a particular embodiment, an open structure of the ceramic base material is filled with a bituminous material that has no greater than approximately 5 weight % of abrasive particles or 0.1 weight % metal content. The recycled roofing material can be disposed along one or both sides of the ceramic base material. The bituminous material may have a characteristic particle size that is smaller than a characteristic particle size of the recycled roofing material. In another embodiment, the roofing product having the recycled roofing material can have tear strength characteristics as compared to a different roofing product having a substantially the same construction but having abrasive particles embedded within the ceramic base material.

23 Claims, 5 Drawing Sheets

(51) Int. Cl.
  *C08L 95/00* (2006.01)
  *B32B 37/24* (2006.01)
  *B32B 38/08* (2006.01)

(52) U.S. Cl.
  CPC ......... *B32B 38/08* (2013.01); *B32B 2037/243* (2013.01); *B32B 2307/7145* (2013.01); *B32B 2315/02* (2013.01); *B32B 2395/00* (2013.01); *B32B 2419/06* (2013.01); *Y02P 20/582* (2015.11); *Y10T 156/1089* (2015.01)

(58) Field of Classification Search
  USPC ... 428/701, 141, 143, 144, 489, 41.8, 320.2, 428/426, 903.3, 490, 496, 491; 427/553, 427/202, 208, 372.2, 402, 186; 156/60; 106/284.02, 284.03
  See application file for complete search history.

(56) References Cited

U.S. PATENT DOCUMENTS

| | | | |
|---|---|---|---|
| 4,992,315 A * | 2/1991 | Zickell et al. | 428/40.3 |
| 5,017,426 A | 5/1991 | Greiser et al. | |
| 5,052,162 A | 10/1991 | Bush et al. | |
| 5,340,391 A | 8/1994 | Grzybowski | |
| 5,571,596 A * | 11/1996 | Johnson | 428/143 |
| 5,720,933 A | 2/1998 | Srinivasan | |
| 5,848,755 A * | 12/1998 | Zickell et al. | 241/65 |
| 6,039,914 A * | 3/2000 | Gehrke et al. | 264/460 |
| 6,120,838 A | 9/2000 | Zickell | |
| 6,134,856 A | 10/2000 | Khan | |
| 6,194,519 B1 | 2/2001 | Blalock et al. | |
| 6,220,329 B1 | 4/2001 | King et al. | |
| 6,228,503 B1 * | 5/2001 | Zickell | 428/489 |
| 6,228,785 B1 * | 5/2001 | Miller et al. | 442/148 |
| 6,286,273 B1 | 9/2001 | Villela et al. | |
| 6,296,912 B1 | 10/2001 | Zickell | |
| 6,355,132 B1 | 3/2002 | Becker et al. | |
| 6,531,200 B2 * | 3/2003 | Zickell et al. | 428/40.1 |
| 6,585,813 B2 * | 7/2003 | Kiik et al. | 106/284.02 |
| 6,887,515 B2 * | 5/2005 | Zickell | 427/186 |
| 6,983,571 B2 | 1/2006 | Felton | |
| 7,125,601 B1 | 10/2006 | Pinault et al. | |
| 7,182,889 B2 | 2/2007 | Aisenbrey | |
| 7,198,735 B2 | 4/2007 | Aisenbrey | |
| 7,238,408 B2 | 7/2007 | Aschenbeck et al. | |
| 7,241,500 B2 * | 7/2007 | Shiao et al. | 428/402 |
| 7,541,059 B2 | 6/2009 | Aschenbeck et al. | |
| 7,592,066 B2 | 9/2009 | Shiao et al. | |
| 7,651,559 B2 | 1/2010 | Whitaker et al. | |
| 7,833,339 B2 | 11/2010 | Whitaker et al. | |
| 7,838,575 B2 | 11/2010 | Lang et al. | |
| 8,168,032 B2 | 5/2012 | Kalkanoglu et al. | |
| 8,197,893 B2 * | 6/2012 | Leitch et al. | 427/188 |
| 2001/0007709 A1 | 7/2001 | Phillips et al. | |
| 2001/0008674 A1 | 7/2001 | Smith et al. | |
| 2002/0040557 A1 | 4/2002 | Felton | |
| 2002/0160151 A1 | 10/2002 | Pinault et al. | |
| 2002/0189189 A1 | 12/2002 | Kupczyk | |
| 2003/0008094 A1 * | 1/2003 | Zickell | 428/40.1 |
| 2003/0068469 A1 | 4/2003 | Aschenbeck et al. | |
| 2003/0091795 A1 | 5/2003 | Kiik et al. | |
| 2003/0209305 A1 | 11/2003 | Smith et al. | |
| 2004/0014385 A1 | 1/2004 | Greaves et al. | |
| 2005/0072110 A1 | 4/2005 | Shiao et al. | |
| 2005/0140042 A1 | 6/2005 | Aisenbrey | |
| 2005/0166956 A1 | 8/2005 | Aisenbrey | |
| 2005/0170141 A1 | 8/2005 | Bacon et al. | |
| 2005/0204675 A1 | 9/2005 | Snyder et al. | |
| 2005/0233663 A1 * | 10/2005 | Lee et al. | 442/180 |
| 2005/0257465 A1 | 11/2005 | Felton | |
| 2005/0281999 A1 | 12/2005 | Hofmann et al. | |
| 2006/0194023 A1 | 8/2006 | Teng | |
| 2006/0265990 A1 | 11/2006 | Kalkanoglu et al. | |
| 2007/0020436 A1 | 1/2007 | Teng et al. | |
| 2007/0026195 A1 | 2/2007 | Pinault et al. | |
| 2007/0039703 A1 | 2/2007 | Lee et al. | |
| 2007/0054129 A1 | 3/2007 | Kalkanoglu et al. | |
| 2007/0077361 A1 | 4/2007 | Shiao et al. | |
| 2007/0144077 A1 | 6/2007 | Quaranta et al. | |
| 2008/0029210 A1 | 2/2008 | Swei et al. | |
| 2008/0044626 A1 | 2/2008 | Aschenbeck et al. | |
| 2008/0060777 A1 | 3/2008 | Wilson et al. | |
| 2008/0209825 A1 | 9/2008 | Smith | |
| 2008/0220167 A1 | 9/2008 | Wisniewski et al. | |
| 2008/0248241 A1 | 10/2008 | Kalkanoglu et al. | |
| 2008/0248244 A1 | 10/2008 | Kalkanoglu et al. | |
| 2009/0117329 A1 * | 5/2009 | Leitch et al. | 428/148 |
| 2009/0163625 A1 | 6/2009 | Lang et al. | |
| 2009/0220743 A1 | 9/2009 | Aschenbeck et al. | |
| 2009/0229491 A1 | 9/2009 | Harmon | |
| 2009/0291260 A1 | 11/2009 | Kiik et al. | |
| 2010/0064937 A1 | 3/2010 | Harmon et al. | |
| 2010/0126663 A1 | 5/2010 | Kalkanoglu et al. | |
| 2010/0129667 A1 | 5/2010 | Kalkanoglu et al. | |
| 2010/0151199 A1 | 6/2010 | Shiao et al. | |
| 2010/0167013 A1 | 7/2010 | Cruz et al. | |
| 2011/0086201 A1 | 4/2011 | Shiao et al. | |
| 2011/0104422 A1 | 5/2011 | Kalkanoglu et al. | |
| 2011/0104440 A1 * | 5/2011 | Kalkanoglu et al. | 428/143 |

OTHER PUBLICATIONS

Hometime Video Publishing, Inc. "Hometime How to Roofing—Types of Shingles & Repairs", 2 pgs, 2008.
Paul Kemp "Laminated Roofing vs. Composition Roofing", 3 pgs, 1999-2013.
Jericho McCune "How to Install Laminated Shingles", 1 pg, printed Jan. 18, 2013.

* cited by examiner

ROOFING PRODUCT INCLUDING A CERAMIC BASE MATERIAL AND RECYCLED ROOFING MATERIAL

RELATED APPLICATIONS

This is related to and claims priority under 35 U.S.C. §119(e) to U.S. Patent Application No. 61/118,181 entitled "Roofing Product Including a Ceramic Base Material and Recycled Roofing Material and a Method of Forming the Same" by Kalkanoglu et al. filed on Nov. 26, 2008, which is assigned to the current assignee hereof and incorporated herein by reference in its entirety. This is related to U.S. patent application Ser. No. 12/619,168 entitled "Method of Forming a Roofing Product Including a Ceramic Base Material and Recycled Roofing Material" by Kalkanoglu et al. filed on Nov. 16, 2009, now U.S. Pat. No. 8,168,032, which is assigned to the current assignee hereof and incorporated herein by reference in its entirety.

FIELD OF THE DISCLOSURE

The present disclosure relates to roofing products and methods of forming roofing products, and more particularly to, roofing products including ceramic base materials and recycled roofing material and methods of forming the same.

RELATED ART

Roofing products can be in different forms, such as shingles or membranes. The roofing products can include a base material and a bituminous material. The base material can include wood, a wood derivative (e.g., paper), fiberglass, organic fibers (e.g., polyester), or the like. Conventionally, the bituminous material can include asphalt, a filler, and potentially a plasticizer. A variety of fillers has been used including limestone, talc, fly ash, coal fines, or other relatively inert materials. Limestone has been most commonly used as filler in roofing products due to its relatively low cost and its compatibility with a wide variety of materials used for roofing products. Traditionally, recycled roofing material has not been used in roofing products.

Currently, recycled roofing materials are being considered for use in forming new roofing products. Methods have been proposed to rejuvenate the bituminous material and to remove roofing nails from the recycled roofing material. Regardless whether a roofing product includes or does not include recycled roofing material, the roofing product must still be able to withstand the rigors of shipping and handling, installation, and exposure to outdoor environments for several years.

BRIEF DESCRIPTION OF THE DRAWINGS

Embodiments are illustrated by way of example and are not limited in the accompanying figures.

Figure 1:
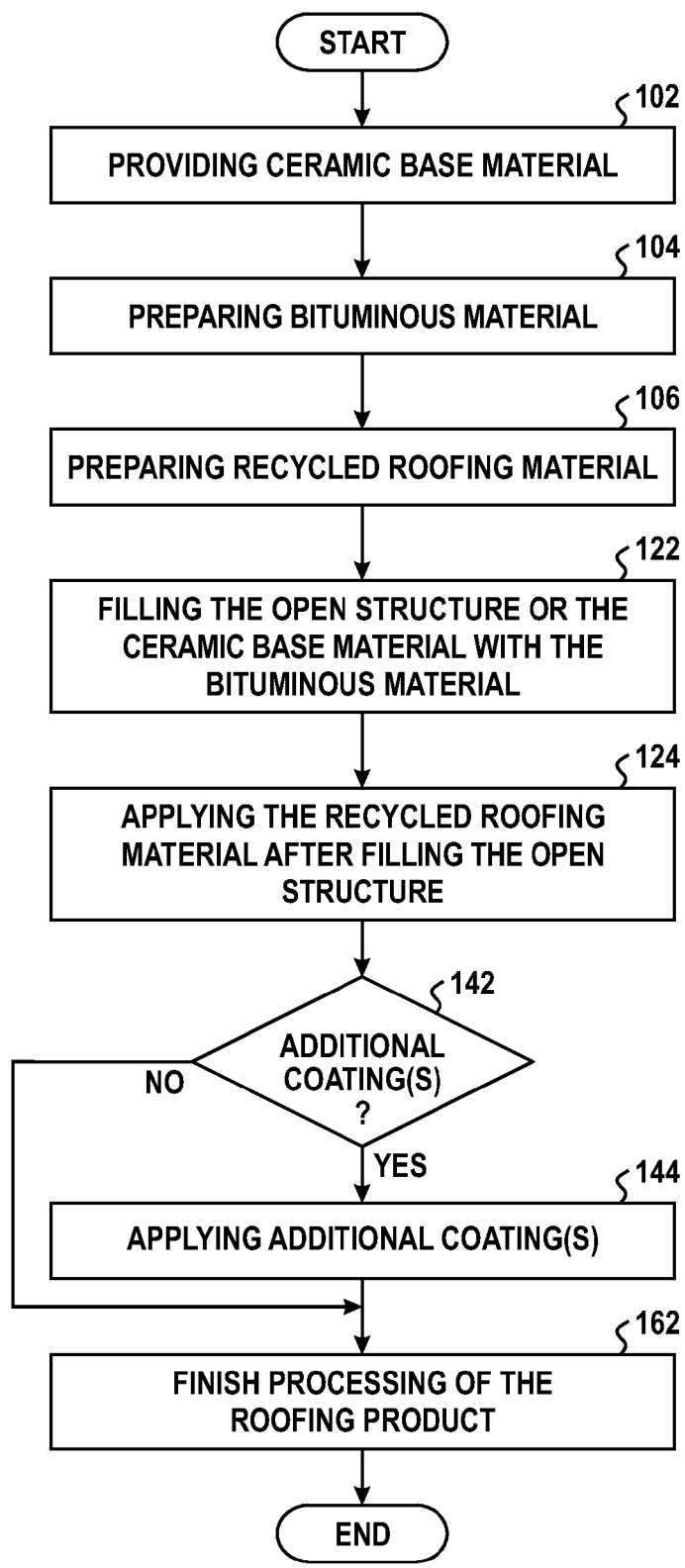
FIG. 1 includes a process flow diagram illustrating an exemplary method of forming a roofing product.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. The term "abrasive particle" is intended to mean a particle having a hardness at least as hard as a ceramic base material used or to be used within the same roofing product.

The term "perimeter volume" is intended to mean a volume generally defined by outer surfaces of an object. For example, a fiberglass mat can include glass fibers in the form of an open structure. The outer surfaces of the fiberglass mat are used to determine the perimeter volume. The volume occupied by only the glass fibers within the fiberglass mat may be substantially less than the perimeter volume.

The term "principal surfaces," with respect to a roofing article or product, is intended to mean a pair of opposite surfaces of such roofing article or product, wherein one of the surfaces lies or would lie farther from a structure to which the roofing article or product is installed or intended to be installed, and the other surface of such roofing article or article lies or would lie closer to a structure to which the roofing article or article is installed or intended to be installed. When installed, the principal surface farther from the structure may be directly exposed to an outdoor environment, and the other principal surface may contact the structure or a different roofing article or product that lies between the other principal surface and the structure.

The term "recycled roofing material" is intended to mean a material that includes at least some roofing article content that is or will become a layer within a roofing product. Recycled roofing material may include at least some material that is not recycled.

The term "roofing article" is intended to mean a roofing product (recently manufactured or used) or a byproduct of a roofing manufacturing process that can be recycled and used to make a newly manufactured roofing product.

The term "roofing product" is intended to mean a final product or an intermediate product of a roofing manufacturing process.

As used herein, the terms "comprises," "comprising," "includes," "including," "has," "having" or any other variation thereof, are intended to cover a non-exclusive inclusion.

For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

The inventors have discovered that a ceramic base material may be damaged if an open structure within the ceramic base material is filled with a material that includes too much abrasive material. The abrasive materials may scratch, abrade, or otherwise damage the ceramic base material. Roofing products having the open structure of the ceramic base material filled with recycled roofing material that includes such abrasive materials, typically in the form of roofing granules, may prematurely fail a mechanical stress or other test, such as a tear test. In an embodiment, the roofing granules may be pulverized, crushed, ground, or otherwise reduced in size to form of a fine powder. Thus, the inventors have discovered that by filling the open structure of a ceramic base material with a bituminous material having a low amount or substantially free of abrasive particles, a roofing product can be formed with recycled roofing material and still have acceptable properties.

FIG. 1 includes a non-limiting, exemplary process flow that can be used to form a roofing product that includes recycled roofing material. The method includes providing a ceramic base material, at block 102. The ceramic base material can be formed or obtained from a commercially available source. The ceramic base material can be vitreous or non-vitreous and have an open structure. The open structure can allow a bituminous material to flow within and partially or completely fill the open structure. The open structure can be in the form of pores, channels, interstitial openings within a matrix, another suitable void, or any combination thereof. The open structure can be characterized as the volume of the ceramic base material that is not occupied by a ceramic material (e.g., glass fibers) and may be expressed as a mat weight. In an embodiment, the mat weight can be at least approximately 25 g/m$^2$ (0.5 lb/100 ft$^2$), at least approximately 40 g/m$^2$ (0.8 lb/100 ft$^2$), or at least approximately 60 g/m$^2$ (1.2 lb/100 ft$^2$). In another embodiment, the mat weight can be no greater than approximately 200 g/m$^2$ (4.0 lb/100 ft$^2$), no greater than approximately 170 g/m$^2$ (3.5 lb/100 ft$^2$), or no greater than approximately 130 g/m$^2$ (2.7 lb/100 ft$^2$). In a particular embodiment, the mat weight can be in a range of approximately 60 g/m$^2$ (1.3 lb/100 ft$^2$) to approximately 120 g/m$^2$ (2.5 lb/100 ft$^2$). The ceramic base material can include an oxide (e.g., silica, alumina, ceria, zirconia, or the like), a nitride (e.g., aluminum nitride, silicon nitride, or the like), a carbide (e.g., tungsten carbide, silicon carbide, or the like), or any combination thereof. In an embodiment, the ceramic base material includes fiberglass, and in a particular embodiment, a fiberglass mat.

The method also includes preparing a bituminous material, at block 104. The bituminous material may be processed to achieve the desired properties. In an embodiment, asphalt, as received, can be oxidized to reduce the amount of volatile chemicals, partially polymerize a compound within the asphalt, or a combination thereof. The process can be used to increase the softening point of the asphalt to over approximately 90° C. (approximately 200° F.) or a penetration distance (100 g at 25° C., ASTM D5) of less than 18 to 22 dmm. In a particular embodiment, asphalt is oxidized by flowing pressurized air into a tank of asphalt heated to approximately 230° C. (approximately 450° F.). For the purposes of this specification, asphalt as received or after the oxidation process, but before adding solids or chemicals, is referred to herein as virgin asphalt.

The virgin asphalt and one or more other components can be combined. Such other components can include fillers, additive chemicals, other suitable components, or the like. Fillers are relatively inert solid particles and allow a relatively less expensive material to displace relatively more expensive asphalt within the roofing product. As used herein, filled virgin asphalt mixture refers to a combination of virgin asphalt and one or more fillers. The filled virgin asphalt mixture may or may not include additive chemicals or other components. In the bituminous material, the filler can include filler particles having a hardness that is less than the hardness of the ceramic base material. For example, when the ceramic base material includes a fiberglass mat, the filler particles can include limestone particles, and when the ceramic base material includes alumina, the filler particles can include limestone particles or sand. With respect to the fiberglass mat, the limestone particles will not scratch the glass fibers, and therefore, will not significantly damage the fiberglass mat if the limestone particles and the glass fibers would contact each other. However, glass can scratch glass, and therefore, sand may scratch the glass fibers of the fiberglass mat if the sand would contact the glass fibers. Unlike a fiberglass mat, alumina is harder than glass, and therefore, a ceramic base material including alumina will not be scratched by sand or limestone particles.

Roofing granules can include materials that are harder than glass. Thus, roofing granules may scratch glass fibers within a fiberglass mat. Therefore, roofing granules are abrasive particles with respect to the fiberglass mat, and thus, may not be included in the bituminous material. Still, a relatively small amount of abrasive particles may be used within the perimeter volume of a ceramic base material without causing a substantial failure of the roofing product. In a particular embodiment, abrasive particles can be distributed within other material that is not as hard as the ceramic base material. For example, limestone can be used as filler. Limestone is principally calcium carbonate; however, limestone may contain a relatively small amount of silica. Because the silica can be distributed throughout the limestone, very little of an already small amount of silica may be present along the perimeter of a limestone particle.

Calcium carbonate within the limestone would be disposed between most of the silica within the limestone and the fiberglass mat, and thus, the calcium carbonate helps reduce the likelihood that a significant amount of silica would contact the fiberglass mat. In an embodiment, the bituminous material has no greater than 5 weight % abrasive particles or no greater than 3 weight %. In another embodiment, the bituminous material has no greater than 1 weight % abrasive particles, and in a further embodiment, the bituminous material is substantially free of abrasive particles. More details regarding the roofing granules are described later in this specification.

For a ceramic base material that includes a fiberglass mat, in addition to limestone, the filler can include talc, clay, non-abrasive coal fines, gypsum, calcite, another similar material, or any combination thereof. In a shingle embodiment, the bituminous material can include at least approximately 45 weight % of filler, at least approximately 50 weight % of filler, or at least approximately 55 weight % of filler. In another shingle embodiment, the bituminous material may include no greater than approximately 80 weight % of filler, no greater than approximately 75 weight % of filler, or no greater than approximately 70 weight % of filler. In a membrane embodiment, the bituminous material may include substantially no filler or may include at least approximately 5 weight % of filler, or at least approximately 10 weight % of filler. In another membrane embodiment, the bituminous material may include no greater than approximately 60 weight % of filler, no greater than approximately 50 weight % of filler, or no greater than approximately 40 weight % of filler. In a further embodiment, the bituminous material can include a higher or a lower filler content than the weight percents recited.

Additive chemicals that can be used with the bituminous material and include a process oil, a plasticizer, a polymer modifier, another suitable compound, or any combination thereof. The process oil can include a napthenic oil, an aliphatic oil, or an aromatic oil, another suitable oil, or any combination thereof. Another exemplary compound can include styrene-butadiene-styrene, styrene-ethylene-butylene-styrene, styrene-isoprene-styrene, acrylonitrile-butadiene-styrene, atactic polypropylene, isotactic polypropylene, high density polyethylene, ethylene-polypropylene copolymer, another suitable plasticizer or polymeric compound, or any combination thereof. A thermoplastic olefin can be formed using a metallocine catalyst and include a block copolymer polypropylene, a polyethylene-propylene rubber, or another suitable material. Typically, the additive chemicals are in the form of solids or liquids at room temperature; however, the additive chemicals do not include asphalt, fillers, or roofing granules. For simplicity, the additive chemicals are referred to herein in the plural even if only a single chemical is used. In an embodiment, the bituminous material may include substantially none of the foregoing additive chemicals, at least approximately 5 weight % of additive chemicals, or at least approximately 10 weight % of additive chemicals. In another embodiment, the bituminous material may include no greater than approximately 40 weight % of additive chemicals, no greater than approximately 30 weight % of additive chemicals, or no greater than approximately 25 weight % of additive chemicals. In a further embodiment, the bituminous material can include a higher or a lower additive chemical content than the weight percents recited.

The bituminous material may include recycled roofing articles (e.g., membranes, shingles, roofer's felt, etc.). Recycled roofing articles can include post-industrial roofing articles, pre-consumer roofing articles, post-consumer roofing articles, or any combination thereof. Post-industrial roofing articles can include partially or completely manufactured roofing articles that remain within the possession of the manufacturer. An example of a recycled roofing article can include a post-industrial roofing article that does not meet a product specification. Post-consumer roofing articles can include roofing articles that have been installed on a structure owned or controlled by a consumer, such as a homeowner or a business. Pre-consumer roofing articles are completely manufactured roofing articles outside the possession of the manufacturer and before the roofing articles are installed. An example of pre-consumer roofing articles can include a bundle of shingles that is damaged by a shipping company or a roofing contractor during shipping or handling, or obsolete products, such as roofing articles with outdated colors or designs, or expired products (e.g., a product that should not be installed on a roof due to age of the product).

If the recycled roofing articles do not have roofing granules or have roofing granules that are not abrasive particles with respect to the ceramic base material, the recycled roofing articles may replace a substantial amount of asphalt within the bituminous material. If the roofing granules are abrasive particles with respect to the ceramic base material, recycled roofing articles may be used in the bituminous material to the extent the roofing granules do not exceed the previously recited weight % for abrasive particles, as described above with respect to fillers. In a particular embodiment, the bituminous material includes recycled roofing articles that are substantially free of abrasive particles, and in another embodiment, the bituminous material is substantially free of recycled roofing articles.

The components for the bituminous material are combined and heated to a temperature above the softening point of the virgin asphalt. The components can be first combined and then heated, or the asphalt can be heated, and then the other components can be added to the softened asphalt. After reading this specification, skilled artisans appreciate that the order of heating, combining or otherwise introducing components in forming the bituminous material can be chosen to meet the needs or desires for a particular application. The bituminous material can be prepared in a conventional or proprietary apparatus used in preparing asphalt for use in roofing products.

The method also includes preparing a recycled roofing material, at block 106. Many of the components within the recycled roofing material can include materials used for the bituminous material, and therefore, a focus of this activity is directed more to additional or different actions that are taken with respect to the recycled roofing materials.

Roofing articles that are being recycled vary greatly with respect to time and exposure to different environmental conditions. Some roofing articles may be recently scrapped, such as post-industrial roofing articles that do not meet product specifications, and therefore, cannot be sold as product. Post-industrial roofing articles can also include cut-outs from the shaping of the shingles during manufacturing (e.g., the cut-outs may correspond to slots that were formed in a finished three-tab shingle). Other roofing articles may be pre-consumer roofing articles that may have been stored at a warehouse or other locations for months. Still other roofing articles may have been installed on a structure for years. Roofing articles may be post-consumer roofing articles that may have been installed on different structures that experienced different environmental conditions. For example, roofing articles installed on a structure exposed to more sun will have received more ultraviolet radiation than roofing articles installed on a different structure exposed to less sun. As time elapses and effective exposure to ultraviolet radiation increases, the composition of materials within the roofing articles can change. For example, volatile chemicals or plasticizers may be driven off or degraded, and further polymerization of an asphalt material may occur.

Therefore, chemicals that will be used with recycled roofing material can include compounds that replace, replenish, or otherwise provide the same or other compounds that have been volatilized or have become degraded. Such compounds can include the additive chemicals described with respect to the bituminous material. Thus, the additive chemicals used in preparing the recycled roofing material can include a process oil, a plasticizer, a polymer modifier, another suitable compound, or any combination thereof. As compared to the bituminous material, the additive chemicals may make up a larger fraction of the starting materials when preparing the recycled roofing material. In one embodiment, virgin asphalt or filled virgin asphalt mixture can be used in recycled roofing material, and in another embodiment, neither virgin asphalt nor filled virgin asphalt mixture is used.

Unlike the bituminous material, abrasive particles are less of a concern with the recycled roofing material. A significant fraction of the recycled roofing material can include roofing granules, sand, other abrasive particles, or any combination thereof. The roofing granules may have a composition as described later in this specification. The roofing granules, sand, or other abrasive particles can be as hard or harder than the ceramic base material. In an embodiment, the recycled roofing material may be substantially free of roofing granules, sand, and other abrasive particles. Alternatively, the roofing granule, sand, or other abrasive particle content within the recycled roofing material may be at least approximately 2 weight %, 5 weight %, or 10 weight %, and in another embodiment, the roofing granule, sand, or other abrasive particle content within the recycled roofing material may be no greater than approximately 50 weight %, 40 weight %, or 30 weight %.

The recycled roofing material may include wood, paper, fiberglass, polyester, or another material that may have been part of a base material used in shingles or a membrane as a roofing article. Alternatively, the recycled roofing materials may include one or more metals from nails, flashing, or from metal fragments generated when making the recycled material (e.g., fragments from steel balls or exposed surfaces within a mixing or grinding apparatus). These metals can include iron, aluminum, copper, zinc, chromium, nickel, or the like, in elemental form (i.e., the metal element by itself and not part of a compound) or as part of an alloy. In an embodiment, the recycled roofing material may be substantially free of the wood, paper, fiberglass, polyester, another base material, and metals content. In another embodiment, the wood, paper, fiberglass, polyester, another base material, or metal content within the recycled roofing material may be at least approximately 5 weight %, 10 weight %, or 15 weight %, and in another embodiment, the wood, paper, fiberglass, polyester, other base material or metals content within the recycled roofing material may be no greater than approximately 30 weight %, 25 weight %, or 20 weight %. The metal content includes the relative amount of any and all metals that are in elemental or alloy form.

The recycled roofing material can include the following materials as starting components for the recycled roofing material in the following exemplary amounts. With respect to recycled roofing articles, in an embodiment, the recycled roofing article content may be at least approximately 5 weight %, 10 weight %, 15 weight %, or 20 weight %, and in another embodiment, the recycled roofing article content may be no greater than approximately 95 weight %, 90 weight %, or 80 weight %.

With respect to virgin asphalt that is not part of the recycled roofing articles, in an embodiment, substantially no virgin asphalt is added. In another embodiment, the virgin asphalt content may be at least approximately 10 weight % or 20 weight %, and in still another embodiment, the virgin asphalt content may be no greater than approximately 95 weight %, 90 weight %, or 80 weight %. With respect to filler particles that are not part of the recycled roofing articles, in a particular embodiment, substantially no filler particles are present. In another embodiment, the filler particle content may be at least approximately 10 weight % or 20 weight %, and in another embodiment, the filler particle content may be no greater than approximately 75 weight %, 60 weight %, or 50 weight %. With respect to additive chemicals that are not part of the recycled roofing articles, in a particular embodiment, substantially no chemicals are added. In another embodiment, the additive chemical content may be at least approximately 5 weight %, 10 weight %, or 15 weight %, and in another embodiment, the additive chemical content may be no greater than approximately 30 weight %, 25 weight %, or 20 weight %. After reading this specification, skilled artisans will appreciate that any of the components may be present in an amount greater or less than approximately the amounts recited herein.

After the recycled roofing material has been generated, the recycled roofing material can have characteristics that are similar to the bituminous material and other characteristics that are substantially different from the bituminous material. Within the recycled roofing material, the total asphalt content, virgin asphalt, asphalt from roofing articles, or otherwise, may be at least approximately 10 weight % or 20 weight %, and in still another embodiment, the virgin asphalt content may be no greater than approximately 95 weight %, 90 weight %, or 80 weight %. With respect to total particle content (e.g., from filler, roofing granules, base material from roofing articles, etc.), in a particular embodiment, the recycled roofing material may have substantially no particles. In another embodiment, the total particle content may be at least approximately 10 weight % or 20 weight %, and in another embodiment, the total particle content may be no greater than approximately 75 weight %, 60 weight %, or 50 weight %. In a particular embodiment, the recycled roofing material may have substantially no additive chemicals. In another embodiment, the additive chemical content within the recycled roofing material may be at least approximately 5 weight %, 10 weight %, or 15 weight %, and in another embodiment, the additive chemical content may be no greater than approximately 30 weight %, 25 weight %, or 20 weight %. After reading this specification, skilled artisans will appreciate that any of the components may be present in an amount greater or less than approximately the amounts recited herein.

Many different materials have been described for use within the recycled roofing material. Any detectable amount of a residual material from roofing articles, a roof, or equipment used to process recycled roofing material can provide proof that recycled roofing material is present within a roofing product. This residual material can include the roofing granules or sand, a roofing article base material (e.g., fiberglass or polyester mat, wood, paper, or the like), a roofing article coating (e.g., an acrylic material), a metal from roofing nails, wood from the roof decking (e.g., plywood), parts of a gutter, downspout, or screen, a material from grinding media (e.g., ceramic or steel balls) or a drum used in breaking down the roofing articles when processing the recycled roofing material, or any combination thereof. Thus, in a non-limiting embodiment, even 0.1 weight % of any of the residual materials within a particular layer of a roofing product indicates that recycled roofing material is present. In another embodiment, the residual roofing materials can be at least 1 weight % of a residual roofing material.

In an illustrative embodiment, the presence of recycled roofing material can be detected by determining the level of acid-insoluble solids disposed within a coating of a roofing product or a portion of such coating. Roofing granules and parting agents, such as sand, talc, or the like, if present along the principal surfaces of the roofing product, are removed from the exposed surfaces of the roofing product. The remaining coating of the roofing product or portion thereof is placed in an appropriate solvent to extract the bituminous material. One or more solvents can be used, and the extraction can be performed as a single wash or a series of washes. In a particular embodiment, a Soxhlet method can be used. After the bituminous material is removed, solids remain and include a mat (e.g., fiberglass, polyester, cellulose, etc.), filler, and solids from the recycled roofing material. If the particular coating or portion thereof includes an embedded mat (e.g., fiberglass, polyester, cellulose, etc.) that is part of the base structure (that is, not residual pieces of a mat within the recycled roofing material), the mat can be removed at this time to form remaining solids.

The remaining solids can then be further processed by disposing the solids in an acid. Acid washing can be used to determine the presence and amount of collateral abrasive content in nonabrasive fillers used in roofing materials. More particularly, limestone is primarily calcium carbonate, and calcium carbonate can be dissolved in an HCl solution. Other materials, such as silica, roofing granules, and metals and metals alloys, do not significantly dissolve in an HCl solution. Thus, by washing the solids in the HCl solution, calcium carbonate from the limestone is dissolved, and acid-insoluble solids remain. The acid-insoluble solids can then be vacuum filtered onto a tared filter paper. After drying and removing the filter paper, the acid-insoluble solids are typically silica, roofing granules, and metals and metals alloys. When the filler principally includes a material other than calcium carbonate, the selection of the acid can be changed to remove the other material while at least some other solids remain.

For a conventional roofing product having limestone filler, the amount of acid-insoluble solids is relatively low because a small amount of the limestone may include silica or another similar material. A particular conventional roofing product that does not include any recycled roofing material may have an acid-insoluble solids content of approximately 1.6% of the remaining solids. Thus, a conventional roofing product without any recycled roofing material has less than 2% of the remaining solids.

Clearly, a roofing product including recycled roofing material has significantly higher acid-insoluble solids content than a conventional roofing product without any recycled roofing material. The recycled roofing material includes roofing granules, many of which are silicates, sand, residual fiberglass mat, metals or metal alloys from a grinding drum or grinding media, or potentially other sources of acid-insoluble materials that may not be present in a conventional roofing product, or if present, at significantly lower levels. Therefore, a coating of a roofing product or portion of such coating including recycled roofing material can have at least 2% acid-insoluble solids (as a percentage of the remaining solids), and in a particular embodiment, at least 3% acid-insoluble solids.

In a particular embodiment in which the coating or portion of such coating includes approximately 3 weight % recycled roofing content, the amount of acid-insoluble solids may be approximately 3.3% of the remaining solids. In another particular embodiment in which the coating or portion of such coating includes approximately 6 weight % recycled roofing content, the amount of acid-insoluble solids may be approximately 5.0% of the remaining solids. In still another particular embodiment in which the coating or portion of such coating includes approximately 12 weight % recycled roofing content, the amount of acid-insoluble solids may be approximately 8.4% of the remaining solids. Thus, the content of acid-insoluble solids provides a good indicia regarding the presence and level of recycle roofing material within a coating of a roofing product or portion of such coating.

Particle size distribution may be an additional indicator that recycled roofing articles are present within a roofing product. A particle size distribution can have characteristic particle size. In a particular embodiment, the characteristic particle size can be an averaged particle size, such as an average, a geometric mean, or a median. Alternatively, the characteristic particle size may be expressed as a percentile. For example, the characteristic particle size may be the particle size at the $5^{th}$ percentile, $95^{th}$ percentile, or other percentile value. For a $95^{th}$ percentile value, the characteristic particle size would mean that 95 percent of all particles are a particular particle size or smaller. In still another embodiment, the characteristic particle size can be the largest particle size of all the particles present. In another embodiment, the characteristic particle size may be determined using a different criterion.

In a particular embodiment, the characteristic particle size of the recycled roofing material is smaller than the characteristic particle size of conventional asphalt shingles or the bituminous material, as previously described. In a particular embodiment, the characteristic particle size of the recycled roofing material is no more than 70%, 50%, or 30% of the characteristic particle size of conventional asphalt shingles or the bituminous material.

Figure 2:
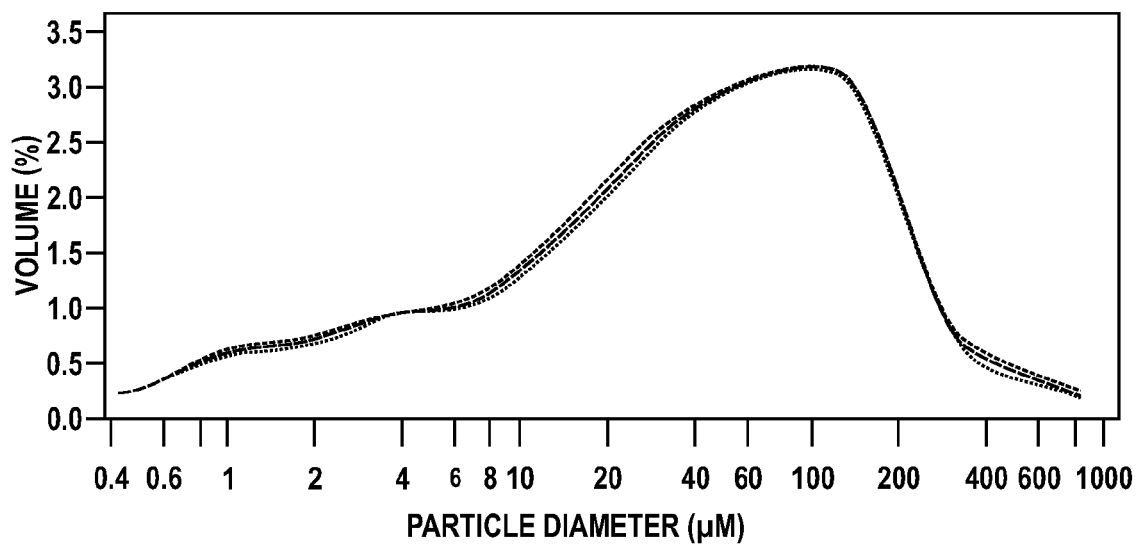
FIG. 2 includes an illustration of a particle size distribution of conventional limestone filler within an asphalt coating.
Figure 3:
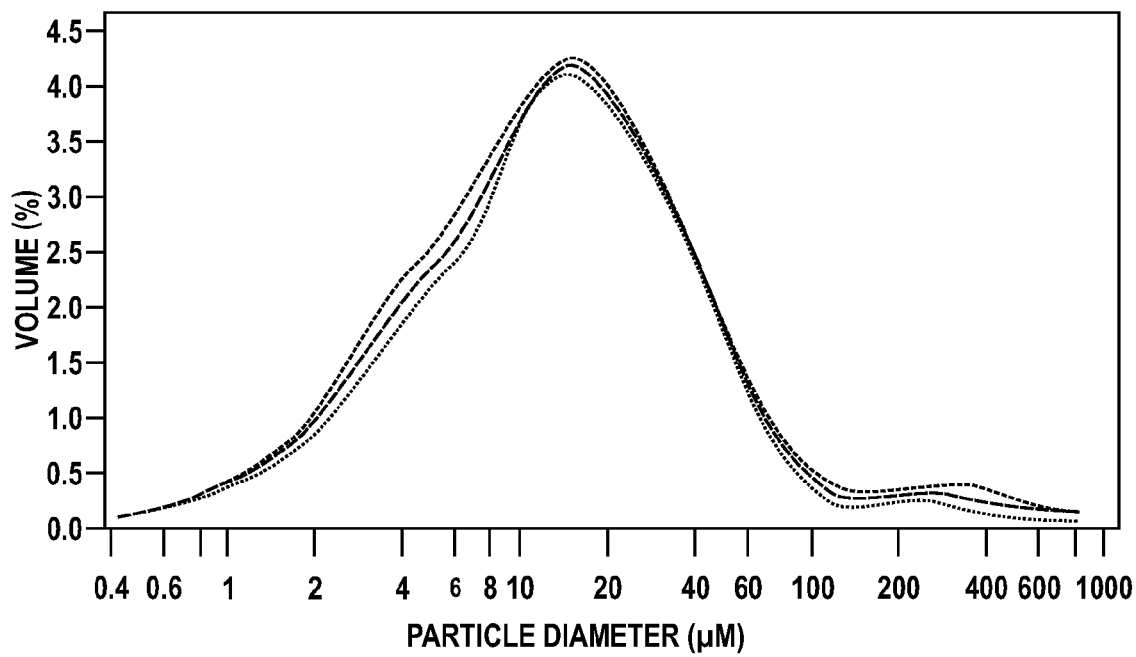
FIG. 3 includes an illustration of a particle size distribution of recycled roofing material.

FIG. 2 includes an illustration of a particle size distribution of conventional limestone filler within an asphalt coating as measured by a Coulter counter, and FIG. 3 includes an illustration of a particle size distribution within a recycled roofing material. The recycled roofing material can be prepared using a Union Process Attritor Model 1-S, approximately 9 mm (⅜ inch) grinding media and a rotational speed of between 100 to 650 rotations per minute.

In this particular embodiment, the characteristic particle size can be a median particle size or the size at the $5^{th}$ or $95^{th}$ percentile. Referring to FIG. 2, for the conventional limestone filler, the median particle size is 44 microns with $5^{th}$ and $95^{th}$ percentiles at 1.4 and 260 microns, respectively. Referring to FIG. 3, for the recycled roofing material, the median particle size is 14 microns (about ⅓ the median particle size of the conventional limestone filler), and the $5^{th}$ and $95^{th}$ percentiles at 1.8 and 81 microns, respectively. Thus, the recycled roofing material can have a narrower distribution of particle size as compared to conventional limestone filler or the previously described bituminous material. In another embodiment, a different apparatus, a different size of grinding media, a different rotational speed, or any combination thereof can be used to prepare the recycled roofing material. Thus, a smaller median particle size and an even tighter distribution of particle sizes may be achieved.

In another embodiment, the particle size distribution of particles in a coating can include a plurality of modes, wherein a particular mode is indicative of recycled material, another particular mode is indicative of a conventional filler, a further particular mode is indicative of filled virgin asphalt mixture or other fresh content, or any combination thereof. For example, one of the modes may correspond to a particle size distribution as illustrated in FIG. 3. In still another embodiment, any significant deviation from the particle size distribution in FIG. 2 may also be indicative of recycled roofing material being present.

Any of the components for the recycled roofing material can be initially processed before such component is used. For example, recycled roofing articles may have roofing nails or other undesired items removed. Recycled roofing articles may or may not be cut or shredded to reduce the individual sizes of the roofing articles. In one particular embodiment, recycled roofing articles are reduced in size to dimensions of about 10 cm×15 cm (4"×6") prior to adding to the media mixer. In other embodiments, the recycled roofing articles may be larger or smaller in size. The virgin asphalt, or filled virgin asphalt mixture, or chemicals may be preheated. Other initial processing may be performed as needed or desired.

The process used in preparing the recycled roofing material may be carried out as a batch or continuous operation. The processing apparatus may include steel balls, ceramic grinding media, or other items that may help to break up the recycled roofing articles into smaller pieces. In a particular embodiment, virgin asphalt or filled virgin asphalt mixture can be heated above its softening point. Additive chemicals can be combined with the virgin asphalt before or after the virgin asphalt or filled virgin asphalt mixture is above its softening point. Recycled roofing articles can be combined with the heated virgin asphalt or filled virgin asphalt mixture and potentially additive chemicals. If needed or desired, additional filler particles can be added to achieve a desired particle content for the recycled roofing material. In another particular embodiment, all components for the recycled roofing material can be combined within the apparatus before or after heating. In still another particular embodiment, a different order of adding the components may be used. After reading this specification, skilled artisans will appreciate that the order in which components are first combined can be tailored to the particular needs or desires for a particular apparatus and application. The recycled roofing material can be in a softened state and optionally may be filtered or magnetically separated during or after preparing the recycled roofing material to remove roofing nails or other undesired items.

Recycled roofing articles can be ground within a media mixer. In a particular embodiment, the media mixer is an attritor that includes a mixing vessel, mixing media, and an agitator. The mixing vessel, mixing media, agitator, and virgin asphalt are heated to approximately 210° C. (approximately 400° F.), with the agitator rotating at approximately 100 revolutions per minute (rpm) for approximately 5 minutes. After mixing media and virgin asphalt or filled virgin asphalt mixture have been mixed, recycled roofing articles can be added.

Before adding the recycled roofing articles, the amount of recycled roofing articles to be added can be determined in order to achieve a desired amount of filler (solids) that is to be present within the mixture. The roofing articles can include parts of fiberglass mats, roofing granules, sand or talc (from parting agents), limestone, or any combination thereof. If the mixture is to include approximately 50 weight % filler, the mixture can include approximately 40 weight % virgin asphalt or virgin asphalt mixture and approximately 60 weight % recycled roofing articles. As the desired amount of filler or composition of the recycled roofing articles within the mixture changes, the relative amounts of virgin asphalt and recycled roofing articles can likewise change.

The recycled roofing articles can be added all at once into the vessel or may be added in segments. When the mixture includes approximately 60 weight % recycled roofing articles, the recycled roofing articles can be added in two (halves) or three (thirds) different stages, with each stage having approximately the same amount of recycle roofing articles. During each stage, the agitator can be stopped and the desired amount of recycled roofing articles can slowly be added. The mixture can be mixed with the agitator rotating at approximately 100 rpm for approximately 1 minute, and then the rotational speed of the agitator can be increased to approximately 350 rpm for approximately 1 minute. The process can be iterated for the remainder of the stages until all of the recycled roofing articles are added.

After all of the recycled roofing articles have been mixed as described above, the resulting mixture can be mixed with the agitator at a rotational speed of approximately 350 rpm for approximately 20 minutes to form a ground mixture. Throughout the process, the temperature setpoint can remain at approximately 210° C. (approximately 400° C.). The ground mixture can then be drained or otherwise removed from the vessel. The ground mixture may have the particle size distribution as illustrated in FIG. 3. While the process has been described with respect to an attritor, skilled artisans will appreciate that other equipment and processes can be used to produce the ground mixture. For example, a rotating ball mill is another media mixer that can be used in forming the ground mixture.

Table 1 includes properties of three different batches of the ground mixture. In Table 1, the softening point is determined using ASTM D-36-06, the viscosity is determined using ASTM D-4402-06, the penetration is determined using ASTM D-5 as described in ASTM D-449-03, and the stain test is determined using ASTM D-2746-07. As used in the tables in this specification, "Total Solids" refers to solids content after asphalt is removed.

TABLE 1

|  |  | Target | Grind 1 | Grind 2 | Grind 3 |
| --- | --- | --- | --- | --- | --- |
| Softening Point (° F.) |  |  | 134 | 136 | 136 |
| Viscosity (cps) @ | 300° F. |  | 875 | 1050 | 1075 |
|  | 325° F. |  | 500 | 575 | 588 |
|  | 350° F. |  | 250 | 350 | 363 |
| Penetration (dmm) | 77° F. |  | 38 | 35 | 37 |
|  | 115° F. |  | 176 | 170 | 162 |
| Remaining Solids (wt %) |  | 50% | 45.7 | 47.0 | 47.7 |
| Acid-Insoluble Solids (% of Remaining Solids) |  | 55% | 50.8 | 50.0 | 51.1 |
| Stain (1/64s of an inch) |  |  | 11.5 | 8 | 7.5 |

Information in the Table 1 can be expressed in metric units. The softening point of Grinds 1, 2, and 3 are approximately 57° C., 58° C., and 58° C., respectively. The temperatures for determining the viscosities are approximately 149° C., 163° C., and 177° C., and the temperatures for determining the penetrations are approximately 25° C. and 46° C. The stain distance of Grinds 1, 2, and 3 are approximately 4.6 mm, 3.2 mm, and 3.0 mm, respectively.

In other embodiments, different levels of total solids content can be different for the ground mixture. The amount of virgin asphalt added may be adjusted to achieve a desired total solids content, viscosity, or both.

In an embodiment, the ground mixture can be used as a recycled roofing material. In another embodiment, another material may be added to reduce the recycled content for the recycled roofing material. A filled virgin asphalt mixture can include virgin asphalt, limestone or other fillers, and potentially additive chemicals. A combination of the filled virgin asphalt mixture and the ground mixture can be combined to form the recycled roofing material. In a particular embodiment, the recycled roofing material can include approximately 5 weight % of the ground mixture with the remainder substantially the filled virgin asphalt mix (recycled roofing material is approximately 3% recycled roofing content). In another embodiment, the recycled roofing material can include approximately 10 weight % of the ground mixture with the remainder substantially the filled virgin asphalt mixture (recycled roofing material is approximately 6% recycled roofing content). In yet another embodiment, the recycled roofing material can include approximately 20 weight % of the ground mixture with the remainder substantially the filled virgin asphalt mixture (recycled roofing material is approximately 12% recycled roofing content). In still other embodiment, part or all of the virgin asphalt can be replaced by styrene-butadiene-styrene (SBS) or another polymer. In a particular embodiment, 10 weight % SBS can be used.

Table 2 below includes data for a roofing product that includes a fiberglass mat that is filled with filled virgin asphalt mixture (control), 10 weight % ground mixture with the remainder filled virgin asphalt mixture (10% mixture), and 20 weight % ground mixture with the remainder filled virgin asphalt mixture (20% mixture). Tests as described with respect to Table 1 can be used to obtain the data in Table 2. In addition, the tear test can be determined using ASTM D-1922 as modified in D-228-08.

TABLE 2

|  |  | Target | Control | 10% mixture | 20% mixture |
|---|---|---|---|---|---|
| Softening Point (° F.) |  | 205-225 | 226 | 212 | 197 |
| Viscosity (cps) | 350° F. | 1500-3000 | 4188 | 3000 | 1800 |
|  | 375° F. |  | 2000 | 1580 | 988 |
|  | 400° F. |  | 1138 | 875 | 625 |
| Penetration (dmm) | 77° F. |  | 7 | 11 | 13 |
|  | 115° F. |  | 15 | 18 | 25 |
| Remaining Solids (wt %) |  | 50% | 55.5 | 55.2 | 53.3 |
| Acid-Insoluble Solids (% of Remaining Solids) |  |  | 1.63 | 6.62 | 11.01 |
| % recycle added based on acid-insoluble solids |  |  |  | 10.3 | 19.4 |
| Stain (1/64s of an inch) |  |  | 5.5 | 6.5 | 6.3 |
| Tear Test (g) | CD | 1700 | 1800 | 1400 | 1300 |
|  | MD |  | 1300 | 1100 | 1000 |

Information in the Table 2 can be expressed in metric units. The softening point of Control, 10% mixture, and 20% mixture are approximately 108° C., 100° C., and 92° C., respectively. The temperatures for determining the viscosities are approximately 177° C., 191° C., and 204° C., and the temperatures for determining the penetrations are approximately 25° C. and 46° C. The stain distance of Control, 10% mixture, and 20% mixture are approximately 2.2 mm, 2.6 mm, and 2.5 mm, respectively.

The target for total solids is 50 weight %. The control, 10% mixture, and the 20% mixture have a solids content of about 53 to 56 weight % solids. Clearly, the acid-insoluble solids content increases with a higher amount of ground mixture. Thus, the control has about 1.6% acid insoluble solids, the 10% mixture has approximately 6.6% acid insoluble solids, and the 20% mixture has approximately 11% acid insoluble solids. Solely by using the acid-soluble solids and knowing the composition of the filled virgin asphalt mixture and the ground mixture within the recycled roofing material, the ground mixture content within the recycled roofing material can be calculated ("% recycle added based on acid-insoluble solids" in Table 2). The 10% mixture is calculated to be approximately 10 weight % ground mixture, and the 20% mixture is calculated to be approximately 19 weight % ground mixture. Thus, acid-insoluble solids content can be used not only to determine the presence or absence of recycled roofing material, but it can also be used to estimate the amount of ground mixture within the recycled roofing material.

Viscosity decreases and penetration distance increases with increasing the ground mixture content. Stain distance is not significantly affected by the increased ground mixture content.

Particularly noteworthy is the tear strength. The tear test is performed in the machine direction (MD), which is substantially parallel to the direction in which the roofing product is principally moved during manufacturing, and the cross direction (CD), which is perpendicular to the machine direction. The tear strength in both directions decreases with an increasing ground mixture content. With respect to CD, the tear strength of the control roofing product is approximately 1800 grams, which is above the specification of 1700 grams. However, the tear strength decreases to 1400 and 1300 grams for the 10% mixture and the 20% mixture, respectively. The solids from recycled roofing articles can include abrasive particles that are believed to fracture or scratch the fiberglass mat and lead to premature tearing in the MD and CD at levels below that seen with the control.

Table 3 below include data for a roofing product similar to the roofing product in Table 2, except that the fiberglass mat is replaced with a polyester mat and the filled virgin asphalt mixture includes 10 weight % of SBS polymer. The tear test for the roofing products in Table 3 was performed as a notched tear in order to initiate tearing. This tear test can be determined using ASTM D-4073, as modified in ASTM D-5147-07b.

TABLE 3

|  |  | Target | Control | 10% mixture | 20% mixture |
|---|---|---|---|---|---|
| Softening Point (° F.) |  | 260-290 | 256 | 255 | 247 |
| Viscosity @ | 350° F. | 2800-4200 | 4375 | 4375 | 3625 |
| (cps) | 375° F. |  | 3000 | 2350 | 1825 |
|  | 400° F. |  | 2300 | 1600 | 1300 |
| Penetration | 77° F. | 40-50 | 39 | 29 | 30 |
| (dmm) | 115° F. |  | 78 | 64 | 67 |
| Remaining Solids (wt %) |  | 30.0% | 27.4% | 31.2% | 33.6% |
| Acid-Insoluble Solids (% of Remaining Solids) |  |  | 1.61 | 12.1 | 20.8 |
| % recycle added based on acid-insoluble solids |  |  |  | 13.0 | 25.7 |
| Stain (1/64s of an inch) |  |  | 3 | 3 | 4 |
| Tear Test (lbf) | CD | 55 | 75 | 70 | 70 |
|  | MD | 55 | 120 | 110 | 120 |

Information in the Table 3 can be expressed in metric units. The softening point of Control, 10% mixture, and 20% mixture are approximately 124° C., 124° C., and 119° C., respectively. The temperatures for determining the viscosities are approximately 177° C., 191° C., and 204° C., and the temperatures for determining the penetrations are approximately 25° C. and 46° C. The stain distance of Control, 10% mixture, and 20% mixture are approximately 1.2 mm, 1.2 mm, and 1.6 mm, respectively.

Many of the trends seen with the roofing products in Table 3 are similar to those seen with the roofing products in Table 2. However, the trend seen with the tear test for the roofing products in Table 3 differs from trend seen with the tear test for the roofing products in Table 2. The tear strength of the roofing products with recycled roofing material is similar to the tear strength of the roofing product without any recycled roofing material. Therefore, abrasive particles, which can scratch glass, do not have a significantly adverse affect on the roofing products that include a polyester mat for a base material.

In summary, with respect to preparation of the recycled roofing material, at block 106 of FIG. 1, many different materials, content of those materials, particular actions in preparing the recycled roofing material, or any combination thereof are disclosed. After reading this specification, skilled artisans will appreciate that preparing the recycled roofing material can be modified to include other materials, content of those materials, particular actions in preparing the recycled material, or any combination thereof to meet the needs or desires for a particular application.

Figure 4:
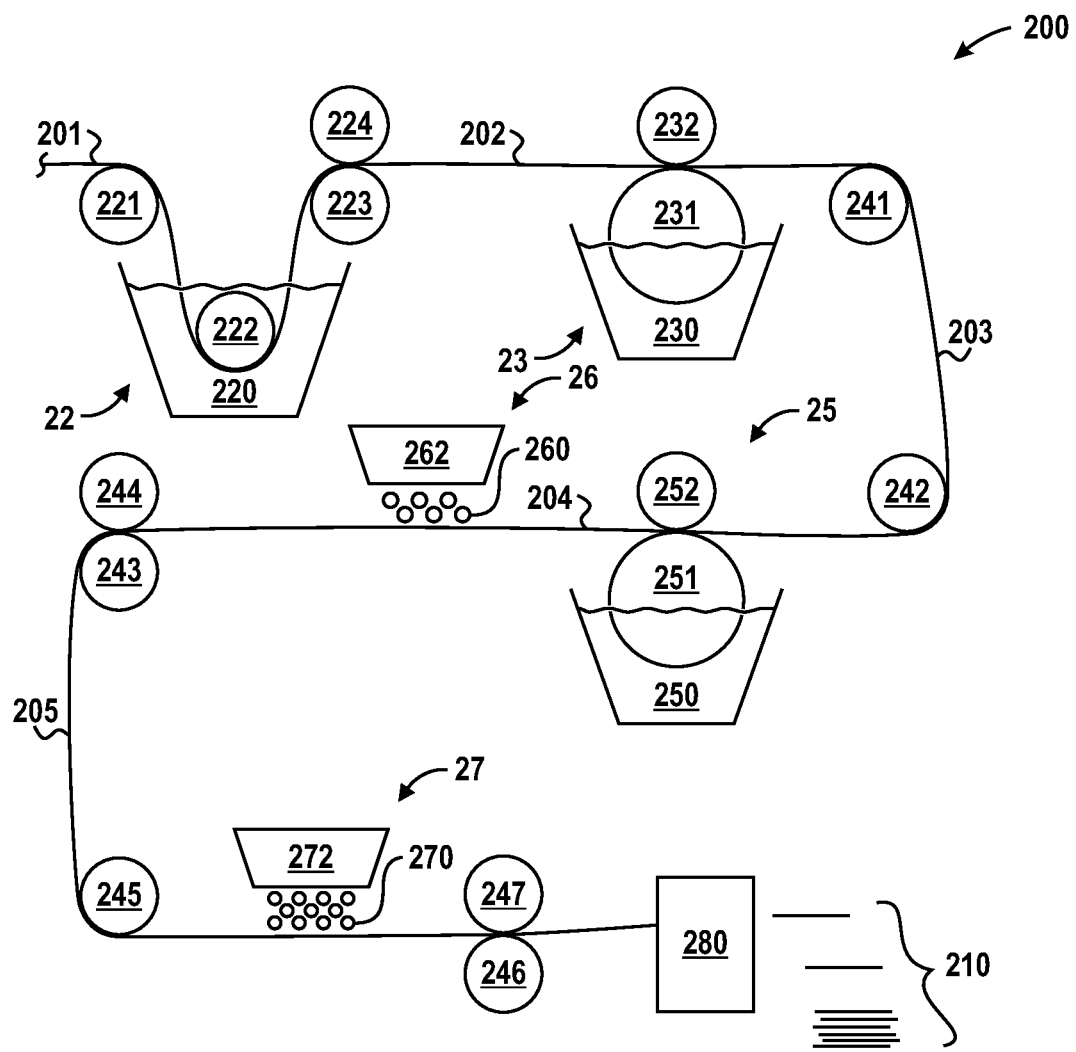
FIG. 4 includes a simplified block diagram illustrating a portion of an apparatus used in manufacturing a shingle-type roofing product.
Figure 5:
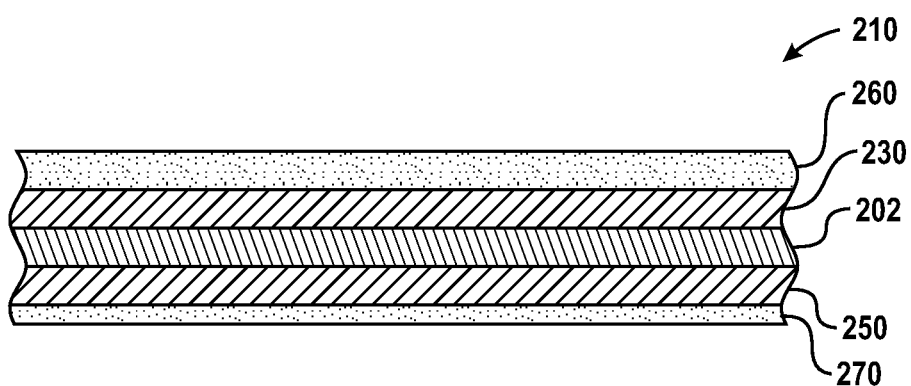
FIG. 5 includes an illustration of a cross-sectional view of a finished roofing product including a ceramic base material and a layer of recycled roofing material.
Figure 6:
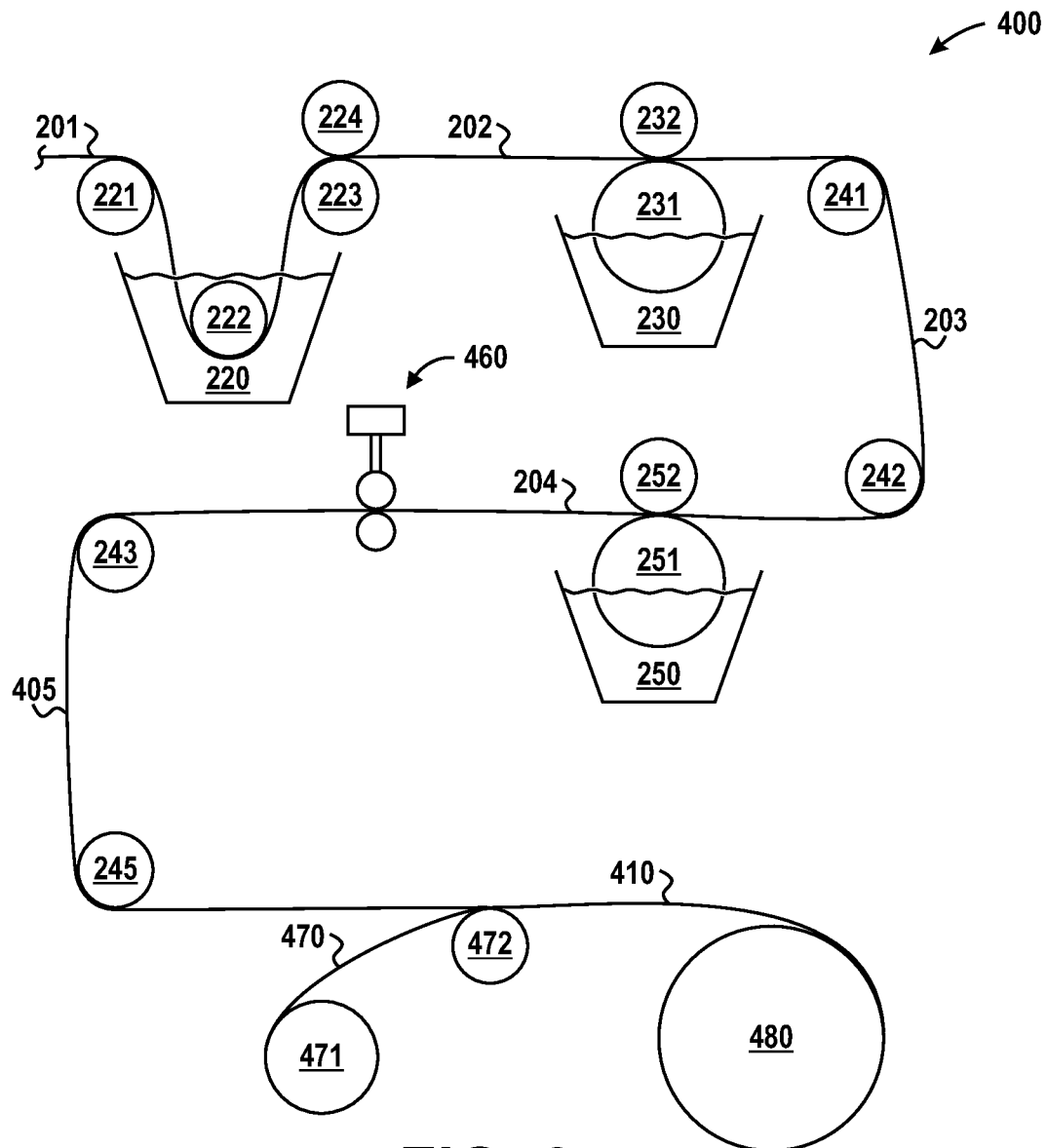
FIG. 6 includes a simplified block diagram illustrating a portion of an apparatus used in manufacturing a membrane-type roofing product.
Figure 7:
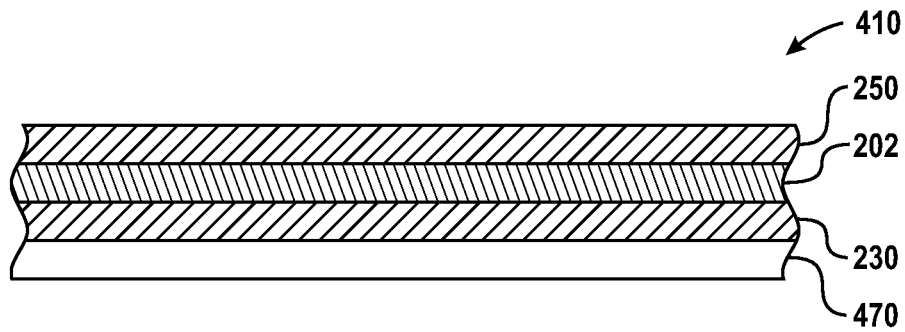
FIG. 7 includes an illustration of a cross-sectional view of another finished roofing product including a ceramic base material and a layer of recycled roofing material.

Before continuing with the method as illustrated in FIG. 1, exemplary, non-limiting apparatuses for manufacturing roofing products are illustrated in FIGS. 4 and 6 that will be described with respect to the remainder of the method in the embodiment as illustrated in FIG. 1. An apparatus 200 in FIG. 4 is particularly suited for manufacturing a shingle-type roofing product 210, a cross-sectional view of which is illustrated in FIG. 5. An apparatus 400 in FIG. 6 is particularly suited for manufacturing a membrane-type roofing product 410, a cross-sectional view of which is illustrated in FIG. 7. After reading this specification, skilled artisans will appreciate that the apparatuses 200 and 400 and the manufacturing operations described herein are simplified to improve the understanding of the concepts as described herein. Other equipment, process controls, and other features and operations may be present or performed in order to manufacture a commercial roofing product.

Referring to the embodiment as illustrated in FIG. 4, the apparatus 200 includes tanks that contain the bituminous material 220 and the recycled roofing material 230 and 250, all of which are in a softened state. The apparatus 200 also includes a hopper 262 that dispenses roofing granules 260, and a hopper 272 that dispenses a parting agent 270. In the embodiment of FIG. 4, after the parting agent 270 is applied, a stamping or cutting operation (illustrated as box 280) is performed to form the finished roofing product 210 in the form of shingles. Rollers 221, 222, 223, 224, 231, 232, 241, 242, 243, 244, 245, 246, 247, 251, and 252 help to guide the roofing product, apply a coating or a layer onto the roofing product, perform another suitable function, or any combination thereof. Subsequent paragraphs provide more details regarding the operation of the apparatus 200 in forming the finished roofing product 210. Such details are to illustrate particular embodiments and not to limit the present invention. In another embodiment, more or fewer parts of the apparatus can be used. After reading the specification, skilled artisans will be able to determine a configuration of the apparatus to make a particular roofing product.

Referring to FIG. 1, the method includes filling the open structure of the ceramic base material with the bituminous material, at block 122. As illustrated in FIG. 4, a ceramic base material 201 can be fed to the apparatus 200. The rollers 221, 222, 223, and 224 help to guide the ceramic base material 201 during a bituminous material stage 22. The open structure of the ceramic base material 201 becomes filled by the bituminous material 220 to form a saturated base material 202. In a particular embodiment, the open structure within the ceramic base material 201 is filled with the bituminous material 220 as it is submerged into the bituminous material 220. In another embodiment (not illustrated), the open structure of the ceramic base material 201 can be filled by spraying or coating the bituminous material 220 onto the ceramic base material 201. Because the bituminous material 220 can have a relatively low abrasive particle content or be substantially free of abrasive particles, the likelihood that the ceramic base material 201 becomes scratched or abraded during the bituminous material stage 22 is reduced and may be substantially eliminated. If too many undesired scratches or abrasions would be formed, they may result in a failure of the ceramic base material 201 during subsequent mechanical stress during manufacturing, shipping and handling, installation, an in-use stress, such as thermal expansion or contraction after the roofing product is installed on a roof, or any combination thereof. The roller 224 can act as a metering roller to help reduce the likelihood that excess bituminous material 220 will exit the bituminous stage 22 with the saturated base material 202.

With respect to the saturated base material 202, the open structure of the ceramic base material 201 may be substantially completely filled with the bituminous material 220. The outermost portions of the ceramic base material 201 within the saturated base material 202 may or may not be exposed. In an embodiment, the volume of the bituminous material 220 is greater than a perimeter volume of the ceramic base material 201, and in another embodiment, the volume of the bituminous material 220 is no greater than the perimeter volume of the ceramic base material 201. In a particular embodiment, with respect to the ceramic base material 201 within the saturated base material 202, a portion of a principal surface of the ceramic base material 201 may be exposed; however, most of the structure or volume of the ceramic base material is embedded within or saturated with the bituminous material 220. Thus, if the ceramic base material 201 is scratched or abraded at this point or later in the process, such a scratch or an abrasion will have a lesser effect on the properties of the finished roofing product, as compared to a roofing product where a substantial amount of abrasive particles would lie within interior portions of the open structure (e.g., when a substantial amount of abrasive particles, e.g., fine roofing granules, sand, fiberglass mat particles, etc., from recycled roofing articles would be used in the bituminous material 220).

The method further includes applying the recycled roofing material after filling the open structure, at block 124. The saturated base material 202 can have a layer of the recycled roofing material 230 applied during a recycled roofing material stage 23 to form an intermediate roofing product 203. The layer including the recycled roofing material 230 may be applied to a principal surface of the saturated base material 202 to form an intermediate roofing product 203. As previously discussed, the recycled roofing material 230 can include a significant amount of abrasive particles. Thus, the bituminous material 220 can substantially prevent the abrasive particles from the recycled roofing material 230 from reaching the center of the ceramic base material 201 within the intermediate roofing product 203. In a particular embodiment wherein the ceramic base material 201 is substantially completely embedded or saturated with the bituminous material 220, the abrasive particles may not contact the ceramic base material 201 when forming the intermediate roofing product 203, and thus, substantially prevent scratching or abrading of the ceramic base material 201 during manufacturing or subsequent handling or use.

A determination is made whether one or more additional coatings are to be applied, at decision tree 142. If yes, the additional coating(s) may be applied to the same, a different, or both principal surfaces of the intermediate roofing product 203, at block 144 in FIG. 1. Referring to FIG. 4, rollers 241 and 242 help to invert the intermediate roofing product 203. During recycled roofing material stage 25, a coating of a recycled roofing material 250 is applied along the opposite principal surface of the intermediate roofing product 203 (as compared to the recycled roofing material 230) to form an intermediate roofing product 204. The recycled roofing material 250 may be the same or different from the recycled roofing material 230. Similarly to the recycled roofing material 230, the recycled roofing material 250 can include a significant amount of abrasive particles. Thus, the bituminous material 220 can substantially prevent the abrasive particles from the recycled roofing material 250 from reaching the center of the ceramic base material 201 within the intermediate roofing product 204. In a particular embodiment wherein the ceramic base material 201 is substantially completely embedded or saturated with the bituminous material 220, the abrasive particles may not contact the ceramic base material 201 when forming the intermediate roofing product 204, and thus, substantially prevent scratching or abrading of the ceramic base material 201 during manufacturing or subsequent handling or use.

In another embodiment, other additional layer(s) can include the bituminous material 220, the recycled roofing material that is the same or similar to the recycled roofing material 230 or 250, another suitable material or compound, or any combination thereof. After reading this specification, skilled artisans can determine whether additional coating(s) are needed or desired and the composition of such other additional coating(s).

After additional coating(s) are applied or if no additional coating is applied ("No" branch of decision tree 142), the method can include finish processing of the roofing product, at block 162. Referring to FIG. 4, a finishing stage 26 can include one or more operations. In an embodiment, a hopper 262 can dispense roofing granules 260 onto the intermediate roofing product 204 to form a substantially completed roofing product 205.

The roofing granules 260 can be used for ultraviolet radiation protection, coloration, impact resistance, fire resistance, another suitable purpose, or any combination thereof. The roofing granules 260 can include inert base particles that are durable, inert inorganic mineral particles, such as andesite, boehmite, coal slag, diabase, metabasalt, nephaline syenite, quartzite, rhyodacite, rhyolite, river gravel, another suitable inert material, or any combination thereof.

The roofing granules 260 can also include one or more coatings over the inert base particles. A coating layer can cover at least approximately 75% of the surface of the inert base particle, and may cover at least approximately 90% of the surface of the inert base particle. In a particular embodiment, the coating continuously covers the surface of the inert base particle, and such coating layer has a substantially uniform thickness. If more than one coating is used, a subsequent coating may cover an underlying coating to the extent described with respect to the inert base particles.

If more than one coating is used, a coating closer to the inert base particles can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A coating can include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric latex binder. The polymeric latex binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. Alternatively, the binder may be a solvent-based coating, a radiation curable coating, or a two-part reactive coating. These alternative coatings may likewise include any of previously described polymeric materials. The same or different algaecide or other biocide can be used within different coatings. An algaecide or another biocide is not required to be present in every coating of the roofing granules. In another particular embodiment, the algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A coating can include a solar reflective material that helps to reflect at least some of the solar energy. For example, UV radiation can further polymerize or harden the roofing product being made. A solar reflective material can include titanium dioxide, zinc oxide, or the like. Alternatively, the solar reflective material can include a polymeric material. In an embodiment, a polymer can include a benzene-modified polymer (e.g., copolymer including a styrene and an acrylate), a fluoropolymer, or any combination thereof. Other solar reflective materials are described in U.S. Pat. No. 7,241,500 and U.S. Publication Nos. 2005/0072110 and 2008/0220167, all of which are incorporated by reference for their teachings of materials that are used to reflect radiation (e.g., UV, infrared, etc.) from the sun.

A coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

An additional coating may be used for a different purpose not described herein. For example, the coating can include a different oxide, nitride, oxynitride, carbide, or any combination thereof. After reading this specification, skilled artisans will be able to determine if an additional function or purpose is to be served by the roofing granules and whether an existing coating or material within a coating serves such a function or purpose or if an additional coating or an additional material within an existing coating would be needed or desired.

More than one type of roofing granule can be used in a roofing product. Thus, roofing granules can have a characteristic hardness. The hardness of each roofing granule can be the hardness of the material along an exposed surface of the roofing granule. If no coating is used, the hardness of a particular roofing granule can be the hardness of the inert base particle for that particular roofing granule. If a coating is used, the hardness of the particular roofing granule can be the hardness of the coating lying along the exposed surface of that particular roofing granule. For a set of roofing granules, the characteristic hardness can be an averaged hardness, such as an average, a geometric mean, or a median. Alternatively, the characteristic hardness may be expressed as a percentile. For example, the characteristic hardness may be a $10^{th}$ percentile, $25^{th}$ percentile, or other percentile value. For a $10^{th}$ percentile value, the characteristic hardness would mean that 10 percent all other roofing granules are as hard or harder than a particular hardness. In still another embodiment, the characteristic hardness can be the highest hardness for the roofing granules within the set. In another embodiment, the characteristic hardness may be determined using a different criterion.

In an embodiment, the roofing granules 260 can make up at least approximately 5 weight %, 8 weight %, or 11 weight % of the substantially completed roofing product 205, and in another embodiment, the roofing granules 260 may make up no greater than approximately 60 weight %, 50 weight %, or 45 weight % of the substantially completed roofing product 205.

In addition to or in place of applying roofing granules 260, another finishing operation can be performed. For example, after the roofing granules 260 are applied, another coating (not illustrated), similar to any single or combination of binders and coatings previously described with respect to the roofing granules 260, may be coated onto the roofing product after roofing granules 260 have been applied. Such binder or coating may have a solar reflective property, an algaecide or other biocide, a pigment or another appearance modifier, or any combination thereof as previously described.

Rollers 243, 244, and 245 help to invert the substantially completed roofing product 205. In another finishing stage 27, a hopper 272 can dispense a parting agent 270 onto the substantially completed roofing product 205. The parting agent 270 helps to keep the roofing product from sticking to itself or sticking to other manufacturing equipment, such as the equipment used in the stamping or cutting operation. The parting agent 270 can include particles of sand, talc, limestone, slag, another relatively inert material, or any combination thereof. After applying the parting agent 270, the roofing product can be processed during a stamping or cutting operation, illustrated as box 280 in FIG. 4, to achieve a desired shape for a finished roofing product 210. In particular, the finished roofing product 210 is in the form of shingles in the embodiment of FIG. 4.

In still another embodiment, no finishing operation may be performed, only one or some, but not all, of the previously-described finishing operations may be performed, or another finishing operation may be performed in addition to or in place of another finishing operation as previously described. Alternatively, the take-up roll may be used instead of or before performing the stamping or cutting operation 280. After reading this specification, skilled artisans will be able to configure a manufacturing line for the particular roofing product being formed.

FIG. 5 includes an illustration of a cross-sectional view of the finished roofing product 210. The finished roofing product 210 includes the saturated base material 202, which includes the ceramic base material 201 (not separately illustrated in FIG. 5) having an open structure that is filled with the bituminous material 220 (not separately illustrated in FIG. 5). The recycled roofing material 250 is disposed between the saturated base material 202 and the parting agent 270, and the recycled roofing material 230 is disposed between the saturated base material 202 and the roofing granules 260. In the embodiment as illustrated in FIG. 5, roofing granules 260 are disposed along one principal surface of the finished roofing product 210, and the parting agent 270 is disposed along the other principal surface of the finished roofing product 210.

In another embodiment, a membrane-type roofing product can be manufactured. FIG. 6 includes the apparatus 400 used to manufacture the membrane-type roofing product. The membrane-type roofing product has significant differences in the manufacturing process because the membrane-type roofing product is typically a self-adhesive product, although this is not a requirement. Still, the manufacturing process used for making membrane-type roofing products may be similar to the manufacturing process used for making shingle-type roofing products.

Referring to a particular non-limiting embodiment as illustrated in FIG. 6, the intermediate product 204 is manufactured using the apparatus 400 in a manner similar to the manufacturing process previously described with respect to the apparatus 200 in FIG. 4.

The finishing operations for a membrane-type roofing product can vary depending on the particular application. In a particular embodiment, a principal surface of the membrane-type roofing product can be directly exposed to an outdoor environment. For this particular application, roofing granules, a coating, or both may be used. When the membrane-type roofing product is used as part of an underlayment or as a lower layer of a built-up roofing system, roofing granules may not be used. The membrane-type roofing product may be applied directly to a roof deck as a base sheet or an underlayment. In this particular application, an adhesive can be used to provide a good seal to help reduce the likelihood of water damage from ice dams.

Referring to the apparatus 400 in FIG. 6, the finishing operation includes applying adhesive and a release sheet to the intermediate roofing product 204. The apparatus 400 includes an adhesive applicator 460 that applies an adhesive (not illustrated) to the intermediate roofing product 204 to form an adhesive roofing product 405. The adhesive can include a tackifier, such as polyvinylbutyral, a pressure sensitive adhesive, another suitable compound, or any combination thereof. A pressure sensitive adhesive can include a silicone, a rubber, an acrylate, a bituminous adhesive, or the like. In a particular embodiment, a styrene-isoprene-styrene rubber composition can be used. A release sheet 470 can be dispensed from a supply roll 471 to the adhesive side of the adhesive roofing product 405 at a roller 472 to form a finished roofing product 410. In the embodiment as illustrated in FIG. 6, the finished roofing product 410 is received by the take-up roll 480.

In an alternative embodiment (not illustrated), an adhesive modifier can be added to the recycled roofing material 250, and thus eliminate a separate adhesive application operation. In this particular embodiment, the release sheet 470 would be applied to the surface having the adhesive-modified recycled roofing material.

FIG. 7 includes an illustration of a cross-sectional view of the finished roofing product 410. The finished roofing product 410 includes the saturated base material 202, which includes the ceramic base material 201 (not separately illustrated in FIG. 7) having an open structure that is filled with the bituminous material 220 (not separately illustrated in FIG. 7). The recycled roofing material 230 is disposed between the saturated base material 202 and the release sheet 470, and the recycled roofing material 250 is exposed along the opposite side of the saturated base material 202. In the embodiment as illustrated in FIG. 7, recycled roofing material 250 is disposed along one principal surface of the finished roofing product 410, and the release sheet 470 is disposed along the other principal surface of the finished roofing product 410. In another embodiment not shown in FIG. 7, granules are included on top of the layer of recycled material 250. In yet another embodiment, a film is laminated to the top surface of the layer of recycled material 250.

After reading this specification, skilled artisans will appreciate that many other roofing products can be made using the concepts as described herein. The particular materials, layer, processes, and other parameters can be tailored for the roofing products that are needed or desired.

The embodiments as described herein can be used to produce a roofing product that includes a ceramic base material and recycled roofing material with acceptable properties. In an embodiment, a roofing product having a relatively low content of or substantially no abrasive particles within the open structure of a ceramic base material can still include recycled roofing material and have good tear resistance. By having a relatively low or no abrasive particle content within a filled ceramic base material, the likelihood of a fracture or a scratch forming within the inner portion of the ceramic base material is significantly reduced, and therefore, less likely to fail when put under stress. Thus, the tear strength of the roofing product as described herein can be closer to a roofing product that does not include any recycled roofing material than a roofing product that includes abrasive particles within the matrix of the ceramic base material.

More particularly, the roofing product as described herein can have a tear strength that is as good as or no less than approximately 70% of the tear strength of a roofing product that does not include any recycled content. In a particular embodiment, the roofing product as described herein can have a tear strength that is no less than approximately 80% or approximately 90% of the tear strength of a roofing product that does not include any recycled roofing material. As a comparison, a roofing product with recycled roofing material deeply embedded or saturated within the open structure of a ceramic base material may have a tear strength that is only approximately 60% of the tear strength of a roofing product without any recycled content.

The embodiments can be used to help reduce waste. By recycling roofing articles, the roofing articles may be used to make new roofing products, rather than occupying valuable space within a landfill. Because roofing articles biodegrade relatively slowly, any reduction of roofing articles in a landfill helps the environment. Still further, roofing products produced with recycled roofing material may be less costly to produce. With the price of crude oil increasing, the price of virgin asphalt increases at the same time or shortly thereafter. Unlike virgin asphalt, the price of the roofing articles may slowly increase as environmental concerns may force scrapped roofing articles to be recycled. Thus, embodiments as described herein allow roofing products to be made at a lower cost as compared to roofing products formed without any recycled roofing articles.

EXAMPLE

The concepts described herein will be further described in the Example, which does not limit the scope of the invention described in the claims. The Example demonstrates that the tear strength of a roofing product can be improved by controlling the location of recycled roofing material, and more particularly, abrasive particles, within a roofing product.

Two types of coatings were prepared. The first type of coating included a filled virgin asphalt mixture, wherein the filler was principally calcium carbonate in the form of limestone. The first type of coating did not include any recycled roofing material. The second type of coating included a combination of a filled virgin asphalt mixture and 17 weight % recycled roofing material. The first type of coating material had no or an insignificant amount of abrasive particles, and second type of coating material included a significant amount of abrasive particles, mostly from roofing granules. Each of Control 1, Control 2, and Example included a fiberglass mat having substantially the same composition and structure.

Control 1 included a roofing product in which the first type of coating material was used during two coating actions. The first action was performed to embed the first type of coating material within a perimeter volume defined by the fiberglass mat. The second action was performed to coat the first type of coating material over the fiberglass mat after the fiberglass mat was embedded with the first type of coating material. Control 1 included no recycled roofing material.

Control 2 included a roofing product in which the second type of coating material was used during two coating actions. The first action was performed to embed the second type of coating material within a perimeter volume defined by the fiberglass mat. The second action was performed to coat the second type of coating material over the fiberglass mat after the fiberglass mat was embedded with the second type of coating material. Control 2 included recycled roofing material, including abrasive particles, within the perimeter volume of the fiberglass mat and within the separate coating.

The Example included a roofing product in which the first type of coating material was used during a first coating action, and the second type of coating material is used during a second coating action. The first action was performed to embed the first type of coating material within a perimeter volume defined by the fiberglass mat. Thus, no recycled roofing material was disposed within the perimeter volume, and therefore, no or an insignificant amount of abrasive particles was within the perimeter volume. The second action was performed to coat the second type of coating material over the fiberglass mat after the fiberglass was embedded with the first type of coating material. Within the Example, the second coating includes recycled roofing material. Thus, the Example used recycled roofing material, wherein abrasive particles from the recycled roofing material did not contact or made only incidental contact with the outer most part of the fiberglass mat.

Controls 1 and 2 and the Example were tested after initially formed and after aging. With respect to aging, Controls 1 and 2 and the Example were aged for 21 days in a dark oven at 158° F. (70° C.) per ASTM D5869-07a, section 4.4. Each of the roofing products was subjected to a tear test. The particular tear test was performed as described in ASTM D-1922 as modified in D-228-08. Table 4 includes the data collected.

TABLE 4

|  | Control 1 | Control 2 | Example |
|---|---|---|---|
| Initial Tear Test (g) | | | |
| Cross Direction, av. | 1152 | 965 | 1111 |
| Cross Direction, std. | 32 | 70 | 36 |
| Machine Direction, av. | 1236 | 955 | 1092 |
| Machine Direction, std. | 138 | 60 | 86 |
| Aged Tear Test (g) | | | |
| Cross Direction, av. | 1232 | 907 | 1211 |
| Cross Direction, std. | 39 | 48 | 82 |
| Machine Direction, av. | 1328 | 997 | 1120 |
| Machine Direction, std. | 166 | 87 | 105 |

Figure 8:
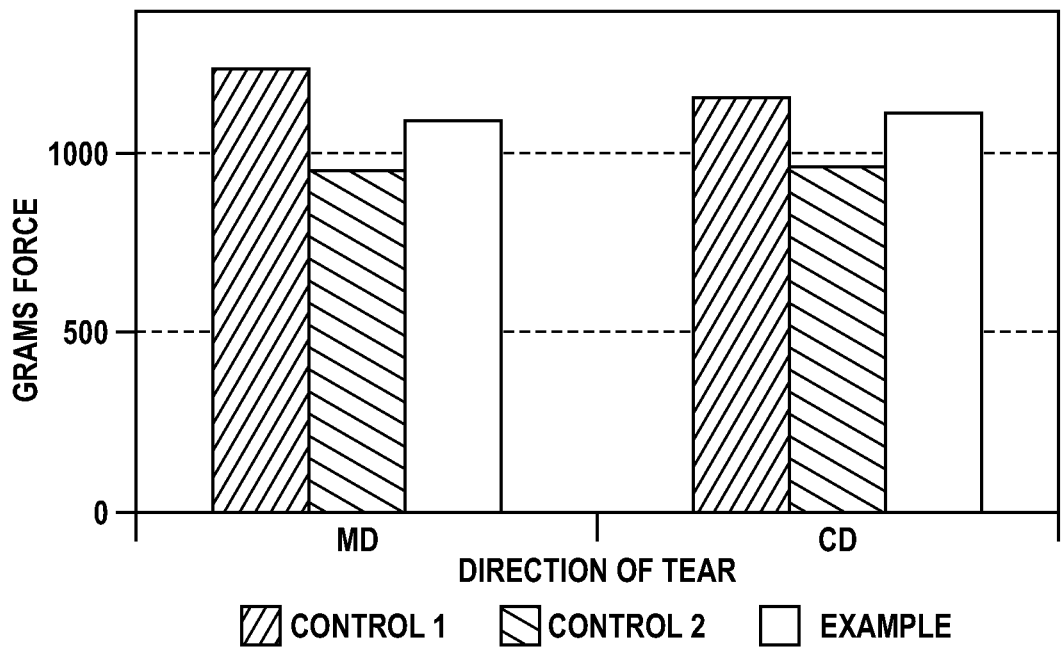
FIGS. 8 and 9 include bar graphs illustrating results of tear tests for initially made and aged roofing products.
Figure 9:
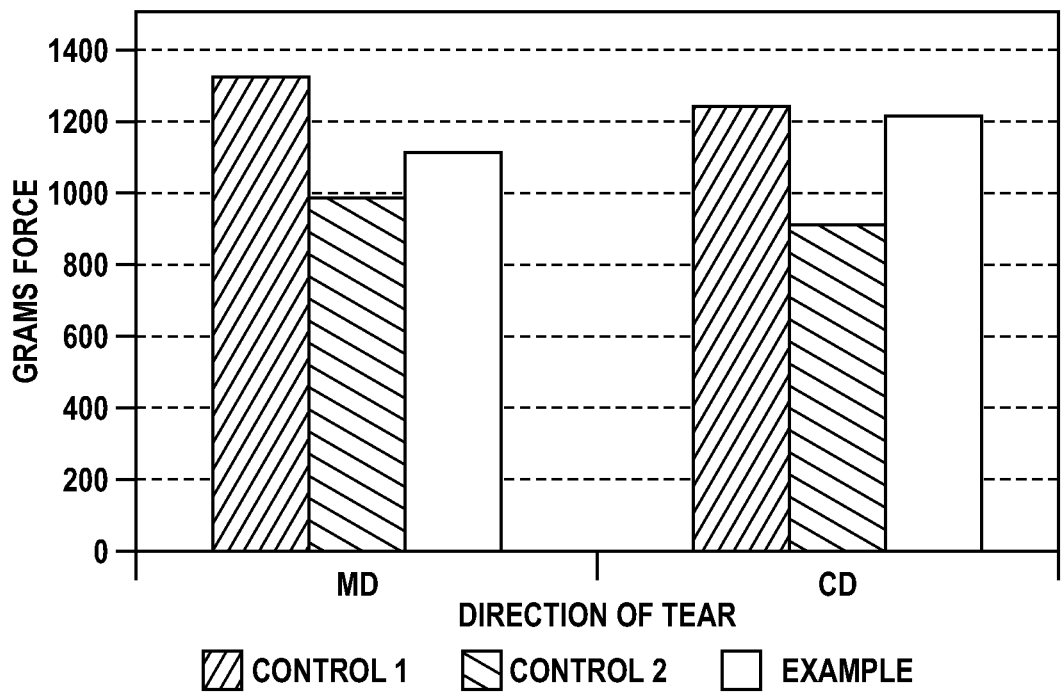

FIG. 8 includes a bar graph displaying the average tear strength for the roofing products, as initially manufactured, in the machine direction (MD, direction in which the roofing product is processed by the manufacturing equipment) and the cross direction (CD, direction perpendicular to MD). FIG. 9 includes a bar graph displaying the average tear strength for the roofing products, after aging, in the machine direction and the cross direction. Clearly, the Example has a higher tear strength as compared to Control 2, both initially and after aging. For the initial tear test, the Example has a tear strength approximately 15% and 14% greater as compared to Control 2 in the cross direction and machine direction, respectively. For the aged test, the Example has a tear strength of approximately 34% and 12% greater as compared to Control 2 in the cross direction and machine direction, respectively.

The Example has a tear strength closer to Control 1 than when Control 2 is also compared to Control 1. In the cross direction, the Example has almost the same tear strength as Control 1. More specifically, in the cross direction, the Example has approximately 96% and 98% of the tear strength of Control 1 for the initially manufactured and aged tests, respectively. Control 2 clearly has a lower tear strength, and typically is less than 80% of the tear strength of Control 1. In the cross direction, Control 2 has approximately 84% and 74% of the tear strength of Control 1 for the initially manufactured and aged tests, respectively. In the machine direction, the Example has approximately 88% and 84% of the tear strength of Control 1 for the initially manufactured and aged tests, respectively. In the machine direction, Control 2 has approximately 75% and 74% of the tear strength of Control 1 for the initially manufactured and aged tests, respectively.

A particular roofing product in accordance with an embodiment described herein has superior tear strength characteristics as compared to other roofing products that include recycled roofing material. As used hereinafter, an embedded abrasives roofing product refers to a roofing product having substantially the same construction as the particular roofing product except that a significant amount of abrasive particles are disposed within the perimeter volume of a ceramic base material, and a recycle-free roofing product refers to a roofing product having substantially the same construction as the particular roofing product except that the roofing product includes substantially no recycled roofing material.

The tear strength for the particular roofing product is greater than the embedded abrasives roofing product. In a particular embodiment, the force needed to tear the particular roofing product can be at least approximately 5% greater than the embedded abrasives roofing product. In another embodiment, the difference in force can be at least approximately 10% greater, in a further embodiment, the difference in force can be at least approximately 15% greater.

When each of the particular roofing product and the embedded abrasives roofing product is compared to the recycle-free roofing product, the tear strength for the particular roofing product can be closer to the tear strength of the recycle-free roofing product than when the embedded abrasives roofing product is compared to the recycle-free roofing product. In the machine direction, the tear strength of the particular roofing product can be at least approximately 80% of the tear strength of the recycle-free roofing product. Further, in the machine direction, the tear strength of the particular roofing product can be at least approximately 85% of the tear strength of the recycle-free roofing product. In the cross direction, the tear strength of the particular roofing product can be at least approximately 85% of the tear strength of the recycle-free roofing product. Further, in the cross direction, the tear strength of the particular roofing product can be at least approximately 90% or even 95% of the tear strength of the recycle-free roofing product.

Many different aspects and embodiments are possible. Some of those aspects and embodiments are described herein. After reading this specification, skilled artisans will appreciate that those aspects and embodiments are only illustrative and do not limit the scope of the present invention.

In a first aspect, a roofing product can include a ceramic base material having an open structure. The roofing product can also include a bituminous material substantially filling the open structure, wherein the bituminous material has no greater than approximately 5 weight % of abrasive particles. The roofing product can further include a recycled roofing material adjacent to the bituminous material.

In an embodiment of the first aspect, the roofing product further includes a release sheet abutting the bituminous material. In another embodiment, the roofing product further includes a release sheet abutting the recycled roofing material and spaced apart from the ceramic base material. In still another embodiment, the ceramic base material includes a vitreous ceramic composition. In a further embodiment, the ceramic base material includes fiberglass. In still a further embodiment, the ceramic base material includes a non-vitreous ceramic composition.

In another embodiment of the first aspect, a volume occupied by the bituminous material is at least as large as a perimeter volume of the ceramic base material. In another embodiment, a volume occupied by the bituminous material is less than approximately a perimeter volume occupied by the ceramic base material. In a particular embodiment, a portion of the recycled roofing material contacts a portion of the ceramic base material. In a further embodiment, the bituminous material includes virgin asphalt. In still a further embodiment, the bituminous material includes virgin asphalt and a plasticizer.

In another embodiment of the first aspect, the bituminous material includes no greater than approximately 80 weight % of filler. In still another embodiment, the bituminous material includes approximately 64 weight % to approximately 70 weight % of filler. In yet another embodiment, the roofing product includes a membrane-type roofing product, and the bituminous material includes no greater than approximately 60 weight % of filler. In a further embodiment, the bituminous material includes filler particles, wherein a hardness of the filler particles within the bituminous material is less than approximately a hardness of the ceramic base material. In still a further embodiment, the filler particles within the bituminous material include limestone.

In another embodiment of the first aspect, the recycled roofing material includes at least approximately 5 weight % recycled roofing articles. In still another embodiment, the recycled roofing material includes at least approximately 10 weight % recycled roofing articles. In yet another embodiment, the recycled roofing material includes at least approximately 20 weight % recycled roofing articles. In a further embodiment, the recycled roofing material includes at least approximately 30 weight % recycled roofing articles. In still a further embodiment, the recycled roofing material includes at least approximately 35 weight % recycled roofing articles. In yet a further embodiment, the recycled roofing material includes at least approximately 39 weight % recycled roofing articles.

In another embodiment, of the first aspect, the recycled roofing material includes abrasive particles. In a particular embodiment, the ceramic base material has a ceramic base material hardness, the abrasive particles have a characteristic abrasive particle hardness, and the ceramic base material hardness is less than the characteristic abrasive particle hardness. In a more particular embodiment, the abrasive particles include inert base particles. In another particular embodiment, the characteristic abrasive particle hardness corresponds to the inert base particles. In still another particular embodiment, the abrasive particles further include a metal compound-containing coating over the inert base particles. In an even more particular embodiment, the characteristic abrasive particle hardness corresponds to the metal compound-containing coating. In a further particular embodiment, the roofing product further includes roofing granules along an exposed surface of the roofing product and spaced apart from the ceramic base material. In more particular embodiment, the roofing granules have a characteristic roofing granule hardness, and the ceramic base material hardness is less than the characteristic roofing granule hardness.

In another embodiment of the first aspect, the roofing product is in a form of a roofing shingle. In still another embodiment, the roofing product is in a form of a roofing membrane. In yet another embodiment, the bituminous material has no greater than approximately 3 weight % of abrasive particles. In a further embodiment, the bituminous material has no greater than approximately 2 weight % of abrasive particles. In yet a further embodiment, the bituminous material is substantially free of abrasive particles.

In another embodiment of the first aspect, a characteristic particle size of the recycled roofing material is smaller than a characteristic particle size of the bituminous material. In still another embodiment, a characteristic particle size of the recycled roofing material is no greater than 70% of a characteristic particle size of the bituminous material. In yet another embodiment, a characteristic particle size of the recycled roofing material is no greater than 50% of a characteristic particle size of the bituminous material.

In a second aspect, a roofing product can include a ceramic base material occupying a perimeter volume, and a bituminous material within the perimeter volume, wherein the bituminous material does not include any recycled roofing articles. The roofing product can include a recycled roofing material adjacent to the bituminous material. The roofing product can have a characteristic selected from a group consisting of (1) the roofing product has a tear strength higher than a tear strength of a first different roofing product having substantially the same structure, wherein the first different roofing product includes the ceramic base material, and wherein abrasive particles are disposed within a perimeter volume of the ceramic base material; (2) in the cross direction, the roofing product has a tear strength of at least approximately 85% of a tear strength of a second different roofing product having substantially the same composition, except the second different roofing product does not include any recycled roofing articles; (3) in the machine direction, the roofing product has a tear strength of at least approximately 80% of a tear strength of the second different roofing product; (4) a characteristic particle size of the recycled roofing material is smaller than a characteristic particle size of the bituminous material; (5) the roofing product includes a bimodal particle size distribution; and (6) the recycled roofing material has a higher metal content than the bituminous material.

In an embodiment of the second aspect, the roofing product has a tear strength higher than a tear strength of the first different roofing product. In another embodiment, in the cross direction, the roofing product has a tear strength of at least approximately 85% of a tear strength of the second different roofing product. In still another embodiment, in the cross direction, the roofing product has a tear strength of at least approximately 90% of a tear strength of the second different roofing product. In yet another embodiment, in the cross direction, the roofing product has a tear strength of at least approximately 95% of a tear strength of the second different roofing product. In a further embodiment, in the machine direction, the roofing product has a tear strength of at least approximately 85% of a tear strength of the second different roofing product.

In another embodiment of the second aspect, the characteristic particle size of the recycled roofing material is smaller than the characteristic particle size of the bituminous material. In a particular embodiment, the characteristic particle size of the recycled roofing material is no more than approximately 70% of the characteristic particle size of the bituminous material. In another particular embodiment, the characteristic particle size of the recycled roofing material is no more than approximately 50% of the characteristic particle size of the bituminous material. In still another embodiment, the characteristic particle size of the recycled roofing material is no more than approximately 30% of the characteristic particle size of the bituminous material. In a further embodiment, the characteristic particle size of the recycled roofing material is a median particle size of particles within the recycled roofing material, and the characteristic particle size of the bituminous material is a median particle size of particles within the bituminous material. In still a further embodiment, the roofing product includes a bimodal particle size distribution.

In another embodiment of the second aspect, the recycled roofing material has a higher metal content than the bituminous material. In a particular embodiment, the metal content for a particular material includes a mass of one or more metals in elemental or alloy form divided by a total mass of a particular material times 100%. In still another particular embodiment, the bituminous material has substantially zero metal content. In yet another embodiment, the recycled roofing material has a metal content of at least 0.1 weight %.

In a further embodiment of the second aspect, the ceramic base material has a ceramic base material hardness, the recycled roofing material includes abrasive particles having a characteristic abrasive particle hardness, and the ceramic base material hardness is less than the characteristic abrasive particle hardness. In a particular embodiment, the abrasive particles include inert base particles. In a more particular embodiment, the characteristic abrasive particle hardness corresponds to the inert base particles. In another more particular embodiment, the abrasive particles further include a metal compound-containing coating over the inert base particles. In an even more particular embodiment, the characteristic abrasive particle hardness corresponds to the metal compound-containing coating. In another particular embodiment, the roofing product further includes roofing granules along an exposed surface of the roofing product and spaced apart from the ceramic base material. In a more particular embodiment, the roofing granules have a characteristic roofing granule hardness, and the ceramic base material hardness is less than the characteristic roofing granule hardness.

In another embodiment of the second aspect, the ceramic base material includes a vitreous ceramic composition. In still another embodiment, the ceramic base material includes fiberglass. In yet another embodiment, the ceramic base material includes a non-vitreous ceramic composition.

In an embodiment of the second aspect, the roofing product further includes a bituminous material within an open structure of the ceramic base material. In a particular embodiment, the bituminous material has no greater than approximately 5 weight % of abrasive particles. In another particular embodiment, the bituminous material has no greater than approximately 3 weight % of abrasive particles. In still another particular embodiment, the bituminous material has no greater than approximately 2 weight % of abrasive particles. In a further particular embodiment, the bituminous material is substantially free of abrasive particles.

In a further particular embodiment, a volume occupied by the bituminous material is at least as large as a perimeter volume of the ceramic base material. In a more particular embodiment, a portion of the recycled roofing material is spaced apart from the ceramic base material. In another particular embodiment, a volume occupied by the bituminous material is less than a perimeter volume occupied by the ceramic base material. In still another particular embodiment, the bituminous material includes virgin asphalt. In yet another particular embodiment, the bituminous material includes virgin asphalt and a plasticizer. In a further particular embodiment, the bituminous material includes asphalt and has no greater than approximately 80 weight % of filler. In still a further particular embodiment, the bituminous material includes approximately 64 weight % to approximately 70 weight % of filler. In yet a further particular embodiment, the roofing product includes a membrane-type roofing product, and the bituminous material includes bituminous and has no greater than approximately 60 weight % of filler. In another particular embodiment, the bituminous material includes filler particles, wherein a hardness of the filler particles within the bituminous material is less than a hardness of the ceramic base material. In still another particular embodiment, the filler particles within the bituminous material include limestone.

In another embodiment of the second aspect, the recycled roofing material includes at least approximately 5 weight % recycled roofing articles. In another embodiment, the recycled roofing material includes at least approximately 10 weight % recycled roofing articles. In still another embodiment, the recycled roofing material includes at least approximately 20 weight % recycled roofing articles. In yet another embodiment, the recycled roofing material includes at least approximately 30 weight % recycled roofing articles. In a further embodiment, the recycled roofing material includes at least approximately 35 weight % recycled roofing articles. In still a further embodiment, the recycled roofing material includes at least approximately 39 weight % recycled roofing articles. In yet a further embodiment, the roofing product further includes a release sheet disposed along an exposed surface of the roofing product. In another embodiment, the roofing product is in a form of a roofing shingle. In still another embodiment, the roofing product is in a form of a roofing membrane.

In a third aspect, a method of forming a roofing product can include providing a ceramic base material having an open structure. The method can also include filling the open structure of the ceramic base material with a bituminous material, wherein the bituminous material has no greater than approximately 5 weight % of abrasive particles. The method can further include applying a recycled roofing material adjacent to the ceramic base material after filling the open structure of the ceramic base material with the bituminous material.

In an embodiment of the third aspect, filling the open structure of the ceramic base material includes saturating the ceramic base material with the bituminous material to substantially fill the open structure of the ceramic base material.

In another embodiment of the third aspect, the method further includes heating the bituminous material such that it is in a softened state, and wherein filling the open structure of the ceramic base material includes submerging ceramic base material into the softened bituminous material. In a particular embodiment, the method further includes increasing a viscosity of the softened bituminous material before applying the recycled roofing material. In another particular embodiment, heating the bituminous material includes heating virgin asphalt. In still another particular embodiment, heating the bituminous material includes heating a mixture of asphalt and filler. In a more particular embodiment, a filler content is less than 80 weight % of the mixture. In another more particular embodiment, a filler content includes approximately 64 weight % to approximately 70 weight % of the mixture. In still another more particular embodiment, the roofing product includes a membrane-type roofing product, and a filler content is less than 60 weight % of the mixture. In a further more particular embodiment, the bituminous material includes filler particles having a hardness that is less than a hardness of the ceramic base material. In an even more particular embodiment, the filler particles within the bituminous material include limestone. In still a further more particular embodiment, heating the bituminous material is performed such that the asphalt is in the softened state, and the filler remains in a solid state. In yet a further more particular embodiment, heating the bituminous material includes heating a mixture of asphalt and a plasticizer. In an even more particular embodiment, heating the bituminous material is performed such that the asphalt and plasticizer are in the softened state.

In another embodiment of the third aspect, after filling the open structure, the bituminous material occupies a volume no greater than a perimeter volume of the ceramic base material. In still another embodiment, after filling the open structure, the bituminous material occupies a volume greater than a perimeter volume of the ceramic base material.

In yet another embodiment of the third aspect, the method further includes forming the recycled roofing material. In a particular embodiment, forming the recycled roofing material includes heating a mixture of asphalt and recycled roofing articles. In a further embodiment, the recycled roofing articles include post-consumer roofing articles. In still a further embodiment, the recycled roofing articles include pre-consumer roofing articles. In yet a further embodiment, the recycled roofing articles include post-industrial roofing articles. In a particular embodiment, the recycled roofing articles include pre-consumer roofing articles. In a more particular embodiment, the recycled roofing articles include post-consumer roofing articles. In another embodiment, the recycled roofing articles make up at least approximately 5 weight % of the recycled roofing material. In still another embodiment, the recycled roofing articles make up at least approximately 10 weight % of the recycled roofing material. In yet another embodiment, the recycled roofing articles make up at least approximately 20 weight % of the recycled roofing material. In a further embodiment, the recycled roofing articles make up at least approximately 30 weight % of the recycled roofing material. In still a further embodiment, the recycled roofing articles make up at least approximately 35 weight % of the recycled roofing material. In yet a further embodiment, the recycled roofing articles make up at least approximately 39 weight % of the recycled roofing material. In another embodiment, the recycled roofing material has a softening point no greater than 125° C. In still another embodiment, the recycled roofing material has a softening point no greater than 105° C.

In a further embodiment of the third aspect, applying a recycled roofing material is performed such that the recycled roofing material is adjacent to one of principal sides of the ceramic base material. In still a further embodiment, applying the recycled roofing material is performed such that the recycled roofing material is adjacent to opposite principal sides of the ceramic base material.

In another embodiment of the third aspect, the method further includes applying roofing granules to an exposed surface of the roofing product after applying the recycled roofing material. In still another embodiment, the method further includes applying a release sheet to an exposed surface of the roofing product after applying the recycled roofing material. In yet another embodiment, a characteristic particle size of the recycled roofing material is smaller than a characteristic particle size of the bituminous material. In a further embodiment, a characteristic particle size of the recycled roofing material is no greater than 70% of a characteristic particle size of the bituminous material. In still a further embodiment, a characteristic particle size of the recycled roofing material is no greater than 50% of a characteristic particle size of the bituminous material. In another embodiment, the method is performed such that the roofing product is in a form of a roofing shingle. In still another embodiment, the method is performed such that the roofing product is in a form of a roofing membrane.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, and may also be provided in combination in a single embodiment. Conversely, various features that are, for brevity, described in the context of a single embodiment, may also be provided separately or in any subcombination. Further, reference to values stated in ranges includes each and every value within that range.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A roofing product comprising:
 a first layer comprising a first principal surface and a second principal surface opposite the first principal surface, the first layer comprising:
  a ceramic base material having an open structure; and
  a bituminous material substantially filling the open structure, wherein the bituminous material comprises virgin asphalt and approximately 64 wt % to 70 wt % of limestone as filler particles, wherein a volume occupied by the bituminous material is less than a perimeter volume occupied by the ceramic base material; and
 a second layer comprising a first recycled roofing material, the second layer overlying the first principal surface and in direct contact with the bituminous material, wherein the first recycled roofing material comprises elemental metal or alloy and has a metal content of at least 0.1 wt %, wherein the first recycled roofing material has at least 2 weight % acid-insoluble solids; and
 a third layer comprising a second recycled roofing material, the third layer overlying the second principal surface and in direct contact with the bituminous material,
 wherein at least one of the second and third layers comprises substantially no virgin asphalt.

2. The roofing product of claim 1, wherein the ceramic base material comprises fiberglass.

3. The roofing product of claim 1, wherein a volume occupied by the bituminous material is at least as large as a perimeter volume of the ceramic base material.

4. The roofing product of claim 1, wherein a portion of the first or second recycled roofing material contacts a portion of the ceramic base material.

5. The roofing product of claim 1, wherein a hardness of the filler particles within the bituminous material is less than approximately a hardness of the ceramic base material.

6. The roofing product of claim 1, wherein the first or second recycled roofing material comprises at least approximately 5 weight % recycled roofing articles.

7. The roofing product of claim 1, wherein the first or second recycled roofing material comprises at least approximately 10 weight % recycled roofing articles.

8. The roofing product of claim 1, wherein the first or second recycled roofing material comprises at least approximately 20 weight % recycled roofing articles.

9. The roofing product of claim 1, wherein the first or second recycled roofing material comprises abrasive particles.

10. The roofing product of claim 9, wherein:
the ceramic base material has a ceramic base material hardness;
the abrasive particles have a characteristic abrasive particle hardness; and
the ceramic base material hardness is less than the characteristic abrasive particle hardness.

11. The roofing product of claim 1, wherein the bituminous material has no greater than approximately 2 weight % of abrasive particles.

12. The roofing product of claim 1, wherein a characteristic particle size of the first or second recycled roofing material is smaller than a characteristic particle size of the bituminous material.

13. The roofing product of claim 1, wherein the second and third layers are free of virgin asphalt.

14. The roofing product of claim 1, wherein the at least one of the second and third layers comprises at least 10 wt % of a polymer.

15. A roofing product comprising:
a ceramic base material occupying a perimeter volume and comprising a first principal surface and a second principal surface opposite the first principal surface;
a bituminous material occupying less than the perimeter volume, wherein the bituminous material comprises virgin asphalt and does not include any recycled roofing articles, wherein the bituminous material comprises approximately 64 wt % to 70 wt % of limestone filler particles;
a first recycled roofing material overlying the first principal surface and in direct contact with the bituminous material, wherein the first recycled roofing material includes a metal in elemental or alloy form, the metal including iron, wherein the first recycled roofing material has a metal content of at least 0.1 wt % wherein the first recycled roofing material has at least 2 weight % acid-insoluble solids; and
a second recycled roofing material overlying the second principal surface and in direct contact with the bituminous material,
wherein at least one of the second and third layers comprises substantially no virgin asphalt.

16. The roofing product of claim 15, wherein, in the cross direction, the roofing product has a tear strength of at least approximately 85% of a tear strength of a second different roofing product having substantially the same composition, except the second different roofing product does not include any recycled roofing articles.

17. The roofing product of claim 15, wherein a characteristic particle size of the recycled roofing material is smaller than a characteristic particle size of the bituminous material, the characteristic particle size of the recycled roofing material is a median particle size of particles within the first or second recycled roofing material, and the characteristic particle size of the bituminous material is a median particle size of particles within the bituminous material.

18. The roofing product of claim 15, wherein:
the ceramic base material has a ceramic base material hardness;
the first or second recycled roofing material comprises abrasive particles having a characteristic abrasive particle hardness; and
the ceramic base material hardness is less than the characteristic abrasive particle hardness.

19. The roofing product of claim 15, wherein the ceramic base material comprises fiberglass.

20. The roofing product of claim 15, further comprising a bituminous material within an open structure of the ceramic base material.

21. The roofing product of claim 20, wherein the bituminous material has no greater than approximately 2 weight % of abrasive particles.

22. The roofing product of claim 20, wherein a volume occupied by the bituminous material is at least as large as a perimeter volume of the ceramic base material.

23. The roofing product of claim 20, wherein a hardness of the filler particles within the bituminous material is less than a hardness of the ceramic base material.

* * * * *